United States Patent [19]

Weisser, Jr.

[11] Patent Number: 5,701,301
[45] Date of Patent: Dec. 23, 1997

[54] MEDIATION OF OPEN ADVANCED INTELLIGENT NETWORK IN SS7 PROTOCOL OPEN ACCESS ENVIRONMENT

[75] Inventor: Frank J. Weisser, Jr., Atlanta, Ga.

[73] Assignee: BellSouth Corporation, Atlanta, Ga.

[21] Appl. No.: 254,590

[22] Filed: Jun. 6, 1994

Related U.S. Application Data

[63] Continuation-in-part of Ser. No. 83,984, Jun. 28, 1993, abandoned, and a continuation of Ser. No. 246,876, May 20, 1994, Pat. No. 5,430,719.

[51] Int. Cl.$^6$ .................................................. H04L 12/56
[52] U.S. Cl. .................................................. 370/428; 379/95
[58] Field of Search .................. 370/60, 94.1, 60.1, 370/14, 110.1, 79, 352, 360, 387, 386, 384, 389, 395, 442, 425, 428, 465; 379/201, 113, 207, 211, 67, 96, 89, 221, 138, 112, 134, 242, 230, 2, 95, 229, 220; 340/825.3, 825.31, 825.32, 825.33, 825.34; 395/186

[56] References Cited

U.S. PATENT DOCUMENTS

| | | | |
|---|---|---|---|
| 4,200,771 | 4/1980 | Kraushaar et al. | 379/138 |
| 4,345,116 | 8/1982 | Ash et al. | 379/221 |
| 4,611,094 | 9/1986 | Asmuth et al. | 379/201 |
| 4,669,113 | 5/1987 | Ash et al. | 379/221 |
| 4,756,019 | 7/1988 | Szybicki | 379/112 |
| 4,768,221 | 8/1988 | Green et al. | 379/67 |
| 4,782,519 | 11/1988 | Patel et al. | 379/221 |
| 4,817,092 | 3/1989 | Denny | 379/2 |
| 4,943,996 | 7/1990 | Baker, Jr. et al. | 379/96 |
| 4,979,118 | 12/1990 | Kheradpir | 364/436 |
| 4,993,024 | 2/1991 | Quinquis et al. | 370/94.1 |
| 5,001,710 | 3/1991 | Gawrys et al. | 270/110.1 |
| 5,027,384 | 6/1991 | Morganstein | 379/67 |
| 5,042,064 | 8/1991 | Chung et al. | 379/113 |
| 5,048,013 | 9/1991 | Eng et al. | 370/79 |
| 5,048,081 | 9/1991 | Gavaras et al. | 379/221 |
| 5,060,258 | 10/1991 | Turner | 379/134 |
| 5,109,405 | 4/1992 | Morganstein | 379/89 |
| 5,231,631 | 7/1993 | Buhrke et al. | 370/60 |
| 5,251,255 | 10/1993 | Epley | 379/242 |
| 5,253,247 | 10/1993 | Hirose et al. | 370/14 |
| 5,282,244 | 1/1994 | Fuller et al. | 379/230 |
| 5,295,183 | 3/1994 | Langlois et al. | 379/113 |
| 5,299,259 | 3/1994 | Otto | 379/207 |
| 5,313,453 | 5/1994 | Uchita et al. | 370/13 |
| 5,418,844 | 5/1995 | Morrisey et al. | 379/230 |
| 5,436,957 | 7/1995 | McConnell | 379/95 |
| 5,463,682 | 10/1995 | Fisher et al. | 379/230 |

OTHER PUBLICATIONS

Enabling CS–1 SSF–SCF capabilities Across Network Borders—Royal PTT Nederland NV—Submission to ITV, May 19, 1993, pp. 1–6.

*Primary Examiner*—Dang Ton
*Attorney, Agent, or Firm*—Jones & Askew, LLP

[57] ABSTRACT

A method of mediation of data packet traffic across an interface between the Advanced Intelligent Network (AIN) operated by a local exchange carrier and a non-local exchange carrier service provider is disclosed. The interface is defined between a service provider's network device, such as a service control point (SCP), that has access to the AIN through SS7 protocol data links connected to a local exchange carrier device, such as a service transfer point (STP). Gateway screening at the STP is used to perform certain mediation steps with respect to data packets that originate with non-local exchange carrier network elements. An invalid data packet is rejected, but a valid data packet is passed for further mediation steps to a mediated access SCP. Prior to further routing of the data packet (other than rejection), the mediated access SCP removes information from the data packet regarding the source of the data packet. The mediated access SCP stores this removed information, generates substitute information, correlates the removed information with the substitute information, and replaces the removed information in the data packet with substitute information. The mediated access SCP examines the responsive data packet upon receipt for inclusion of the substitute information. If the responsive data packet does not include this substitute information, the data packet is rejected. If the responsive data packet includes the substitute information, and is otherwise valid, mediated access SCP correlates the substitute information to the removed information, and uses the removed information to further route the data packet.

46 Claims, 12 Drawing Sheets

MEDIATION OF OPEN ADVANCED INTELLIGENT NETWORK IN SS7 PROTOCOL OPEN ACCESS ENVIRONMENT

CROSS REFERENCE TO RELATED APPLICATIONS

This application is a continuation-in-part of U.S. application Ser. No. 083,984, filed Jun. 28, 1993 entitled "Mediation of Open AIN Interface for Public Switched Telephone Network" now abandoned, and a continuation-in-part of U.S. application Ser. No. 08/246,876 now U.S. Pat. No. 5,430,719, filed May 20, 1994 entitled "Mediation of Open Advanced Intelligent Network Interface by Shared Execution Environment". Applicant incorporates by reference the above-referenced co-pending and commonly owned patent applications.

TECHNICAL FIELD

The present invention relates to the field of switched telephony, and in particular, is a method of mediating message content and network impact that will be allowed by providing access to the Advanced Intelligent Network associated with modern telephone switching systems to a wide range of entities other than local exchange carriers.

BACKGROUND OF THE INVENTION

In the slightly more than a century of having telephone service available in the United States, the public switched telephone system has constantly evolved and grown in complexity, size, and capabilities. From the days in which calls were routed by a human operator working a plug board to switch and complete calls, the capacity of the system in both volume of traffic and service options has expanded greatly. A telephone company central office or central office switch is a device to which multiple subscriber lines are connected, each of which is terminated by a telephonic device of a customer. For conventional residential telephone service, one or more telephone sets will be connected to the subscriber line. Additionally, the central office has multiple trunk circuits connecting it to other central offices. Other trunk circuits are provided to customers, such as trunks feeding a private branch exchange (PBX) switch in a business office.

Some early developments of enhanced telephone service include the introduction in the early 1960s of direct long distance dialing. Prior to that time, all long distance toll calls had to be handled by one or more human operators who set up the call circuit and activated billing equipment. An important feature of the enabling technology for direct long distance dialing is the capability of switches to collect, store, and forward data identifying the dialed digits, i.e., the called number. These were transmitted through the network, as the call was set up via a well known signaling scheme known as multifrequency (MF) signaling. MF signaling is a species of in-band signaling in that the information signals (identification of the called number) was transmitted by signals within the voice frequency band, over the same trunk circuits that carried the voice signal once the call was completed. This technology allowed a much higher volume of long distance traffic to be handled and helped to significantly improve telephone service and to meet the demand for more and more service in the United States during the 1960s and 1970s. The major drawback of in-band signaling techniques was that they occupied voice trunk capacity during call set up. Furthermore, if the call could not be completed for some reason, such as the called number across the country was busy, cross country trunk capacity was occupied while the call set up migrated its way through the network and the report of the busy was returned back over the voice lines to the calling party. Five to ten seconds, for thousands and thousands of busy calls per day, translates to significant usage of trunk capacity.

In the late 1970s and early 1980s, American Telephone & Telegraph Company (AT&T) developed early species of common channel interoffice signaling (CCIS). CCIS is essentially a network architecture for a switched telephone network in which information about a telephone call is transmitted over high speed data links that are separate from the voice circuits that are used to transmit the signals of the call itself. Early in the development of common channel interoffice signaling, it was recognized that the interoffice data signaling links could be designed to provide high speed digital data that could first determine whether a call could be completed prior to assigning mink capacity to set up the voice link. Thus, with common channel interoffice signaling, if a caller in Atlanta is dialing a number in Seattle, the identity of the called number can be transmitted over the interoffice signaling data links from the originating central office in Atlanta to the terminating central office in Seattle. The terminating central office is the central office that services the called number. If the called number is busy, data providing this information is transmitted back over the interoffice signaling link to the originating central office in Atlanta that locally provides an audible busy signal to the caller. Therefore, no long distance trunk capacity is occupied during this process and the voice circuits between Atlanta and Seattle that formerly would have been used to attempt to complete the call remain free for other uses. If the called number in Seattle is not busy, various devices in the network respond to the information about this call to assign interoffice trunks to set up a connection for the call, and it is then completed.

The public switched telephone network evolved in the 1980s to a complex and very versatile system, most of which supports and is controlled by a form of common channel interoffice signaling. The basics of this network were designed by AT&T. Development of the network by the Regional Bell Operating Companies (RBOC) as well as other independent local telephone service providers has continued since the judicially mandated divestiture of local exchange carriers by AT&T in 1984. The basic architecture of the switched telephone network is, in significant parts, identical throughout the United States and the developed industrialized world including western Europe and Japan. The specifics of the current network described in this specification are those employed by the RBOCs and other local exchange carriers operating in the United States. This network architecture is used by all modern telephone switching systems in the United States and is virtually identical to modern systems in western Europe and Japan.

Modern interoffice signaling takes place over digital links using a protocol referred to as signaling system 7 (SS7), referred to in greater detail hereinbelow. The Advanced Intelligent Network (AIN) may be thought of as a superset of existing interoffice signaling in that it has the following characteristics. First, it also uses the SS7 protocol. Basically, the Advanced Intelligent Network is the collection of resources and interconnections that cause Advanced Intelligent Network messages known as triggers to be generated and to provide the appropriate responses. A trigger is a particular event that generates a new AIN message sequence. Customers of the local exchange carriers must pay a tariff for having triggers provided to the AIN in connection with particular trigger events. For example, specialized services that relate to inbound calls to a number normally require the customer for that directory number to subscribe to a termination attempt trigger. This generates an AIN message whenever the network detects that some party has attempted to place a call to that particular directory number. Service control points then consult their databases to determine what non-standard response may be appropriate for the handling of the call given that a trigger was received.

The need for the present invention results from an event that many people familiar with the telephone business in the United States believe will be forthcoming in the near future: provision of access to the Advanced Intelligent Networks operated by local exchange carriers to third parties so that third parties may provide competitive telephone related services to local exchange carrier subscribers. In other words, it is believed likely that either voluntarily or by regulatory mandate, the local exchange carriers (LECs) (i.e., the local telephone service providers) will be required to allow others to access the Advanced Intelligent Network that controls many modern features and services offered by telephone companies, including the setting up and taking down of voice connections.

In the modern intelligent public switched telephone network, the same signaling path described above that is used for basic call set up, take down and routing, is also used to provide enhanced custom calling features and to control the operation of billing equipment and maintain billing records. Thus, it will be appreciated that allowing access to this network to parties other than the local exchange carrier is a proposition that is fraught with peril. The careless or malicious party with access to the digital network that controls the telephone system and access to information stored therein can seriously hamper proper operation of the public switched telephone network, corrupt data stored therein, including billing data, or surreptitiously obtain private information stored within the network unless adequate precautions are taken if and when access to third parties is provided. Therefore, the present invention has been developed in anticipation of open access to the intelligent network of the public switched telephone system.

In order to understand both the need for the present invention and its implementation, it is first necessary to understand the fundamental architecture of the modern Advanced Intelligent Network and the points at which an interface may be provided to third parties. FIG. 1 of this specification is a block diagram representing at least part of the AIN of a typical local exchange carrier. While the diagram is simple, the components thereon are well known to those skilled in the art. A plurality of central office switches is provided in a typical public switched telephone network. A service switching point (SSP) is the AIN component of a modern central office switch. These are indicated as SSP switches 15–15' in FIG. 1. The dashed line between these indicate that the number of SSP switches is arbitrary. Also, non-SSP switches, such as switch 16, are included within the network.

The difference between an SSP central office switch and a non-SSP central office switch is that the former includes intelligent network functionality. This is an indication that the switch is equipped with appropriate hardware and software so that, when a set of predetermined conditions are detected, the switch will initiate a trigger for a predetermined state of a call on a subscriber line, generate the trigger as an appropriate message to be sent out over the AIN, and suspend handling of a call until it receives a reply from the network instructing it to take certain action. In the alternative, the switch will have a default task to execute if a timeout occurs and no response is provided by the network to the query made by the switch. In summary, the SSP switches are those that are fully equipped to deal with and take advantage of the Advanced Intelligent Network described herein.

Non-SSP switch 16 is an electronic switch that can generate certain rudimentary data packets and provide them over the network, but which must rely on other equipment, described in greater detail hereinbelow, to provide subscriber lines connected to such a switch with more complex features and services available in the intelligent network. Central offices 15–15' and 16 each have a plurality of subscriber lines commonly designated as 17–17', connected thereto. Typically, the number of subscriber lines will be on the order of 10,000 to 70,000 lines. Each of subscriber lines 17–17' is connected to a terminating piece of customer premises equipment, that is represented by a like plurality of telephone sets 18–18' for each of the switches.

Interconnecting central office switches 15 and 16 are a plurality of trunk circuits indicated as 19a and 19B in FIG. 1. These are the voice path trunks that interconnect the central offices and over which calls are connected when completed. It should be understood that central office trunking in a typical urban environment is not limited to a daisy chain arrangement implied by FIG. 1. In other words, in a typical network, trunk circuits will exist between central office switch 15' and central office switch 16. Therefore, when a local call is made between two central offices, if a direct trunk connection exists between the offices, and is not busy, the network will assign that trunk to the completion of that particular call. If there is no direct trunking between the two central offices, or the direct trunks are all in use, the call will be routed along trunks from the originating central office to at least one other central office, and through subsequent trunk connections on to the terminating central office.

This general architecture is magnified when a wider geographic area that includes multiple local exchange carriers is considered. In that case, the only significant difference is that certain inter exchange carrier switches that switch nothing but long distance trunk circuits are included.

Most of the intelligence of the intelligent switched telephone network resides in the remaining components shown on FIG. 1. These are the computers and switches that embody the current version of the common channel interoffice signaling scheme mentioned above. Each of switches 15 through 16 is connected to a local signal transfer point (STP) 20 via respective data links 21A, 21B, and 21C. Currently, these data links are 56 kilobit per second bidirectional data links employing a signaling protocol referred to as CCITT Signaling System 7 (SS7). The SS7 protocol is well known to those skilled in the art and is described in a specification promulgated by the American National Standards Institute (ANSI). The SS7 protocol is a layered protocol wherein each layer provides services for layers above it and relies on the layers below to provide it with services. The SS7 protocol employs data packets, which also are synonymously referred to as packets, information packets, message packets, or messages. A data packet includes the usual beginning and terminating flags and a check bit. Additionally, a signal information field is provided that includes a variable length user specific data and a routing label. A service information octet is provided that identifies a priority of the message, the national network of the destination of the message, and the user name identifying the entity that created the message. Also, certain control and sequence numbers are included within the packet, the uses and designations of which are known to those skilled in the art and described in the above referenced ANSI specification. A major characteristic of the SS7 protocol is its layered functional structure. The SS7 protocol's transport functions are divided into four levels, three of which constitute the Message Transfer Part (MTP). The fourth consists of a common Signaling Connection Control Part (SCCP). The SS7 protocol consists of four basic sub-protocols: Message Transfer Part (MTP), which provides functions for basic routing of signaling messages between signaling points; Signaling Connection Control Part (SCCP), which provides additional routing and management functions for transfer of messages other than call set-up between signaling points; Integrated Services Digital Network User Part (ISUP), which provides for transfer of call set-up signaling information between signaling points; and Transaction Capabilities Application Part (TCAP) which provides for transfer of non-circuit related information between signaling points.

All of the SS7 data packets from the switches go to a signal transfer point (STP) 20. Those skilled in the art will recognize that signal transfer point 20 is simply a multi-port high speed packet switch that is programmed to respond to the routing information in the appropriate layer of the SS7 protocol, and route the packet to its intended destination. The signal transfer point is not normally, per se, the destination of a packet, but merely directs traffic among the other entities on the network that generate and respond to the data packets. It should be noted that signal transfer point devices such as STP 20 are conventionally installed in redundant pairs within the network so that if one device fails, its mate takes over until the first STP is able to return to service. In practice, there are redundant data links between each of central office switches 15 through 16 for enhanced reliability. For the sake of simplicity of the drawings, the redundant devices have not been illustrated in the drawing figures in this specification.

Also connected to signal transfer point 20 over SS7 data link 25 is a 1AESS network access point (NAP) 22. Network access point 22 is a computing device programmed to detect trigger conditions. It requires the support of an SSP switch to notify AIN network systems of these trigger detection events. An SSP can support multiple NAP switches. Logically, this SSP is designated as the destination address for many of the packets generated by the network that would otherwise be routed to the 1AESS NAP if it were an SSP equipped switch.

Much of the intelligence, and the basis for many of the new enhanced features of the network reside in the local service control point (SCP) 26 that is connected to signal transfer point 20 via SS7 data link 27. As is known to those skilled in the art, service control points are physically implemented by relatively powerful fault tolerant computers. Typical implementation devices include the Star Server FT Model 3200 or the Star Server FT Model 3300, both sold by American Telephone & Telegraph Company. The architectures of these computers are based on Tandem Integrity S2 and Integrity S1 platforms, respectively. In most implementations of a public switched telephone network, service control points are also provided in redundant mated pairs in order to assure reliability and continued operation of the network.

The computing devices implementing service control points typically accommodate one to twenty seven disk drives ranging from 300 megabytes to 1.2 gigabytes per drive, and have main memory on the order of 24 to 192 megabytes. Thus, it will be appreciated that these are large and powerful computing machines. Among the functions performed by the service control points are maintenance of network databases used in providing enhanced services. The computers embodying the SCPs can execute at a speed on the order of 17 million instructions per second. Using the SS7 protocol, this translates to about 50 to 100 transactions (query/response pairs) of network messages per second.

Service control point computers were initially introduced into the network to handle the necessary translations and billing transactions for the implementation of 800 number service, i.e., toll free (to the caller) long distance service. An 800 number subscriber has at least one dial-up line number that is to be called when a call to that subscriber's 800 number is placed. There is no physical central office or area of the country that corresponds to the 800 area code. It is significantly more economical to provide a few central locations at which the lookup of the directory number for an 800 call can be made than to provide the translation information redundantly at many central office switches. Currently, service control points also include databases for credit card call transactions.

Also, service control points include databases that identify particular service customers. In order to keep the processing of data and calls as simple and generic as possible at switches, such as switches 15–15', a relatively small set of triggers are defined at the switches for each call. A trigger in the network is an event associated with a particular subscriber line that generates a packet to be sent to a service control point. The trigger causes the service control point to query its database to determine whether some customized calling feature or enhanced service should be implemented for this particular call, or whether conventional plain dial-up telephone service should be provided for the call. The results of the database inquiry are sent back to the switch from SCP 26 through STP 20.

The return packet includes instructions to the switch as to how to process the call. The instruction may be to take some special action as a result of a customized calling service or enhanced feature, or may simply be an indication that there is no entry in its database that indicates that anything other than plain telephone service should be provided for the particular call. In response to receiving the latter type message, the switch will move through its call states, collect the called digits, and generate further packets that will be used to set up and route the call, as described hereinabove.

Similar devices for routing calls among various local exchange carriers are provided by regional signal transfer point 28 and regional service control point 29. The regional STP 28 is connected to local STP 20 via an SS7 data link 30. The regional STP 28 is connected to the regional SCP 29 via a data link 31 that is physically and functionally the same as data link 27 between the corresponding local devices. As is the case with the local devices, regional STPs and SCPs are provided in mated redundant pairs for the purposes of reliability.

Both local and regional service control points 26 and 29 are connected via respective data links 35 and 36 to a service management system (SMS) 37. The service management system is also implemented by a large general purpose digital computer and interfaces to business offices of the local exchange carrier and interexchange carriers. The service management system downloads information to the databases of the service control points 26 and 29 when subscribers modify their ensemble of AIN services. Similarly, the service management system downloads, on a non-realtime basis, billing information that is needed in order to appropriately invoice telephone company subscribers for the services provided.

The modern Advanced Intelligent Network also includes service nodes (SNs) such as service node 39 shown in FIG. 1. Those skilled in the art will be familiar with service nodes, which are physically implemented by the same types of computers that embody the service control points 26 and 29. In addition to the computing capability and database maintenance features, service node 39 also includes voice and DTMF signal recognition devices and voice synthesis devices. Service node 39 is connected to service management system 37 via a data link 40 that services the service node in essentially the same way it services SCPs 26 and 29. While service node 39 is physically quite similar to SCP 26, there are some important differences in the uses to which it is put. Service control points such as SCP 26 normally implement high volume routing services, such as call forwarding and 800 number translation and routing. They are also used for maintenance of and providing access to high volume databases for authorization of billing, such as credit card number validations. In most local exchange carrier networks, service control points are only used for database look up and routing services that take place prior to the logical completion of the call, i.e., the provision of a ringing signal to the called subscriber line and ring back to the calling subscriber.

By contrast, service nodes, such as service node 39, are used principally when some enhanced feature or service is needed that requires an audio connection to the call or transfer of a significant amount of data to a subscriber over a switched connection during or following a call. As shown in FIG. 1, service node 39 is typically connected to one or more (but normally only a few) switches via Integrated Service Digital Network (ISDN) links shown as 41. Thus, services that are implemented during a call (i.e., after completion of ringing or called subscriber pick up) usually employ the facility of a service node such as service node 39.

To give the reader an example, voice announcement of a calling party is a custom feature that is implemented via service node 39. Assume a subscriber dials the number of another subscriber, Ms. Jones, who subscribes to a service to provide voice announcement of incoming calls. One of the call progress states for an SSP equipped switch occurs after collection of the dialed digits when a termination request trigger is generated by the switch. This trigger consists of an SS7 data packet that is routed through STP 20 to SCP 26 and identifies the particular called party number. The SCP looks up the record for the directory number associated with Ms. Jones' phone line and detects that she is a subscriber to a service that provides voice announcements identifying incoming calls. SCP 26 then sends packets back over data link 27 to STP 20 that are routed to both the central office associated with the calling party's subscriber line and that of Ms. Jones.

The central office of the calling party is instructed to wait or place ring back on the calling party's subscriber line. Another packet is routed to switch 15'. It includes the identity of Ms. Jones' directory number, the calling party number, and a request for access to a voice synthesizer channel in service node 39. Switch 15' establishes a voice and data circuit over ISDN links 41 with the service node and passes a packet (in an appropriate ISDN format) to the service node. The service node then queries its database to determine if there is an entry in Ms. Jones' record (actually the record for her directory number) for the particular calling number.

In the meantime, the necessary voice trunks have been connected between central office 15' and the central office serving Ms. Jones' telephone line and thus, a voice path exists between the synthesizer in service node 39 and Ms. Jones when answer supervision is returned on her subscriber line. The synthesizer will then announce the identity of the calling party and the person answering Ms. Jones' telephone can take appropriate action (such as pressing a particular number on the phone) to indicate whether or not they want to receive the call. The DTMF number is recognized by a DTMF recognition circuit in the service node that is likewise bridged onto the voice circuit. The service node then generates appropriate packets indicating whether the call has been accepted or rejected that travel over the ISDN link 41 to switch 15'. In the switch, protocol translation takes place so that the information in these packets is formatted into proper SS7 protocol packets that are then passed on to signal transfer point 20 and routed to appropriate offices to either set up the voice link between the calling party and Ms. Jones' subscriber line, or to provide appropriate audible indication (such as busy or reorder tone) to the calling party.

The foregoing description is a basic overview, together with a few examples, of the operation of the Advanced Intelligent Network that is a modern public switched telephone system. As will be apparent to both those skilled in the art and the casual but interested reader of this specification, the integrity of the data packets passing through the network is crucial to its operation. The integrity of the data packets must be maintained in order for the system to function properly so that calls may be completed. Furthermore, since the SS7 data packets control the allocation of voice circuit capacity, it is critical to proper operation of the network that spurious or unneeded requests for trunk capacity not be generated within the network.

The inventor of the present invention believes that opening the network SS7 data links to third parties so that they may provide customized services over the telephone network will be regulated so that the third party providers will not be required to provide extensive information to the local exchange carrier about the nature of the service provided. Thus, the prospect of opening the network to third party suppliers of enhanced calling services is one that requires careful mediation at the interface between the local exchange carrier network and the third party, and monitoring of activity and data packet messages to protect both the integrity and operation of the network and the privacy of all service providers' subscribers.

Also, much of the information maintained in databases within the network can constitute sensitive business information of the customers of the local exchange carriers. Information on the rate at which a business receives telephone calls, the 800 number traffic it experiences, or even the temporal characteristics of calls to particular businesses can constitute information that might be useful to a business competitor of an LEC customer. Therefore, if the network is opened, there is a need to carefully check and restrict the type of information to which non-LEC customers are given access.

The current use of separate SS7 signal packets to control call routing was, in significant part, motivated by a need to reroute calls in order to provide custom calling services or enhanced services. The simplest example is, of course, the forwarding of a call intended for one subscriber line to another one. However, the ability to reroute calls to a subscriber line other than that associated with the number dialed also leads to a potential for business mischief if and when the network is opened to third party generators of data packets.

For example, if not controlled, a competitor of one business that uses inbound phone calls as a significant source of new customers could generate a packet on the network that instructed a service control point computer to forward a call from a competitor to the phone of the business entity that generated the network message. This could be done periodically, leaving the forwarding order in place for only short periods of time, so that a certain percentage of incoming calls were bled off in this fashion. Thus, in the event the network is opened to third parties, there is a need to protect the integrity of the call routing process from unauthorized or improper attempts to reroute calls or interfere with calls that the third party entity having access to the network should not affect.

In summary, the Advanced Intelligent Network is a complex, high speed, high traffic volume data packet switched messaging arrangement that provides a great deal of versatility in the handling of telephone calls. Most network elements, and in particular the SSP switches, are designed so that a relatively simple format of a query message is generated upon certain events and the switch will wait for a response from the network before proceeding with call processing. These procedures employ a watchdog timer that will timeout in the event a response to the query is not received. However, in circumstances where further call progress was controlled by the occurrence of timeouts, as opposed to a valid response, for a large percentage of the calls being processed, there would be a significant deterioration in the performance of the network. It would cause customers to experience undue delays in call processing or the inability to have enhanced features properly provided. Fundamentally, it is the versatility of the network that leads to its vulnerability to inappropriate network messages. Therefore, if and when the network is opened so that access to the Advanced Intelligent Network is available to third party enhanced service providers, there is a need to provide mediation of message traffic across the interface between the local exchange carrier and the third party service provider, and to protect the network from mischief, human error, and equipment failure on the third party service provider's side of the interface.

SUMMARY OF THE INVENTION

The present invention is a method of mediating Advanced Intelligent Network message traffic in an open Advanced Intelligent Network environment by the use of network elements in an SS7 protocol open access environment. More particularly, the preferred form of the present invention is accomplished in an Advanced Intelligent Network by using mediation steps at an STP and at a mediated access SCP with respect to data packets that are received from or bound for a service provider SCP that provides instructions regarding multiple service provider services.

The opening of the Advanced Intelligent Network to non-local exchange carrier service providers creates a tension between the need to have every element in the system unambiguously detect the destination of Advanced Intelligent Network messages and the appropriate destination for a response on the one hand, and on the other hand, the need to assure that a service provider cannot abuse access to the Advanced Intelligent Network to obtain improper access to information about competitors or to somehow sabotage operation of the network or operation of a particular competitor's application on the system.

To prevent unauthorized access to the Advanced Intelligent Network, the present invention employs gateway screening in an STP to perform certain mediation steps with respect to a data packet that originated with a non-local exchange carrier network element such as a service provider SCP. The STP checks the data packet for a valid originating code, a valid destination code, a valid service indicator, and may check for the validity of other selected parameters. If any of these values are invalid, the data packet is rejected. If these values are valid, the STP transmits the data packet to the mediated access SCP.

To further prevent unauthorized access to the Advanced Intelligent Network, the present invention employs the mediated access SCP to remove certain information from a data packet that is addressed to a service provider SCP. The information is removed so that the information may not be used by a service provider to obtain improper information about the network or applications running on the network. To accomplish removal of this information without hindering the routing of the data packet through the network, the present invention provides that the mediated access SCP replace the information with substitute information. In particular, the mediated access SCP removes the information in the data packet that corresponds to the transaction number assigned by the network element that originated the data packet, the originating point code that corresponds to the originating network element, and the subsystem number of the originating network element. Preferably, the first transaction number, the originating point code and the subsystem number comprise a first transaction identifier for the data packet. The first transaction identifier is stored by the mediated access SCP. As a substitute for the removed information, the mediated access SCP generates a random number that is referred to as a second transaction number, which is associated with the data packet for use in the signaling path between the mediated access SCP and the service provider SCP. Through the use of a random number as the second transaction number, no information is provided to the recipient of the data packet regarding network operations. The mediated access SCP stores the second transaction number, and in particular, the stored second transaction number is mapped into the stored first transaction identifier. Preferably, the mediated access SCP also stores the destination point code of the data packet with the second transaction number.

As another means of preventing unauthorized access to the Advanced Intelligent Network, the present invention employs the mediated access SCP to examine the validity of a data packet that is received as a response. For a valid response, the data packet should include the second transaction number assigned to the data packet originally by the mediated access SCP 26'. If the data packet does not include this second transaction number, the data packet is rejected. Preferably, in connection with a response received from a service provider SCP, mediated access SCP compares the received transaction number and SS7 originating address (or point code) of the service provider SCP with the second transaction number and the destination point code of the data packet when it was a query. The compared transaction numbers and the point codes must match, or the data packet is rejected. This second comparison protects against abuse of unintended direct routing of the service provider responses to SSPs and protects against "back-door" SS7 protocol circuits. If the received information corresponds to the stored information, the mediated access SCP obtains the corresponding first transaction identifier from storage. The first transaction identifier provides the mediated access SCP with further routing or destination information for the data packet.

The present invention also provides a method for managing the Advanced Intelligent Network through steps performed by the mediated access SCP in monitoring the condition of the service provider SCPs that the mediated access SCP services. In one aspect of the management method, the mediated access SCP keeps track of the time that it takes a service provider SCP to return a responsive message. If the service provider SCP takes longer than a specified minimum amount of time to return a responsive message, the mediated access SCP takes steps to reduce the service provider's load of new messages by discarding (also referred to as rejecting) query messages as they are presented to the mediated access SCP. Another aspect of the management method of the present invention is that a mediated access SCP monitors the status of a service provider SCP that has been determined previously to be out-of-service. Preferably, the mediated access SCP periodically sends a test message to the out-of-service service provider SCP. When a test message or a series of test messages is handled correctly by the service provider SCP, traffic to the service provider SCP is automatically restarted by mediated access SCP.

Therefore, it is an object of the present invention to provide privacy, security, and reliability for the Advanced Intelligent Network for the service providers who access the Advanced Intelligent Network and for customers of service providers as well as the local exchange carriers.

It also is an object of the present invention to provide an improved method of mediating the traffic in data packet messages in the Advanced Intelligent Network.

That the present invention accomplishes these objects and meets the needs of local exchange carriers in an open Advanced Intelligent Network environment will be appreciated from the detailed description of the preferred embodiment to follow.

DETAILED DESCRIPTION OF THE PREFERRED EMBODIMENT

Figure 1:
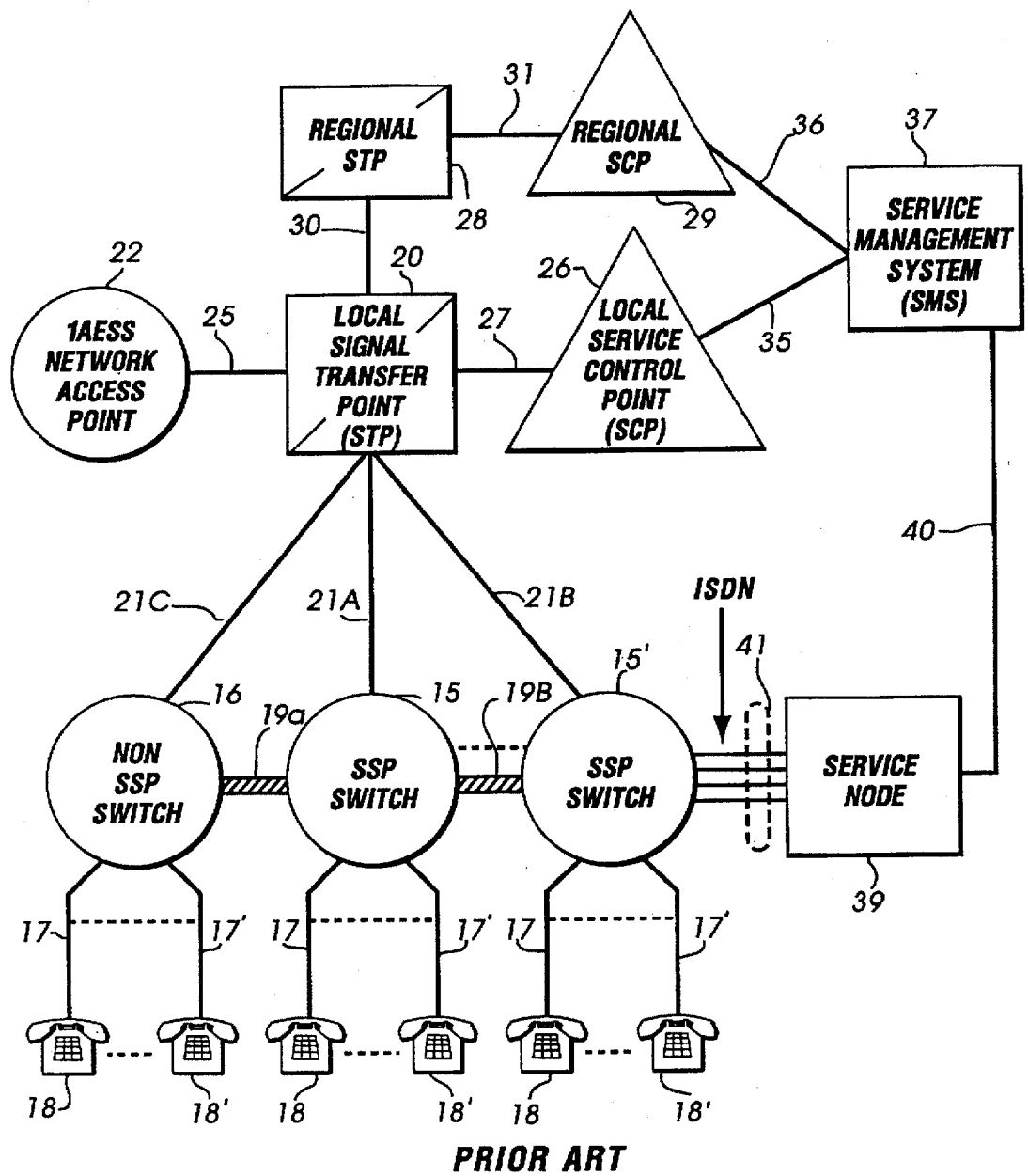
FIG. 1 is a diagram of a prior art existing switched telephone network including the Advanced Intelligent Network that controls same.
Figure 2:
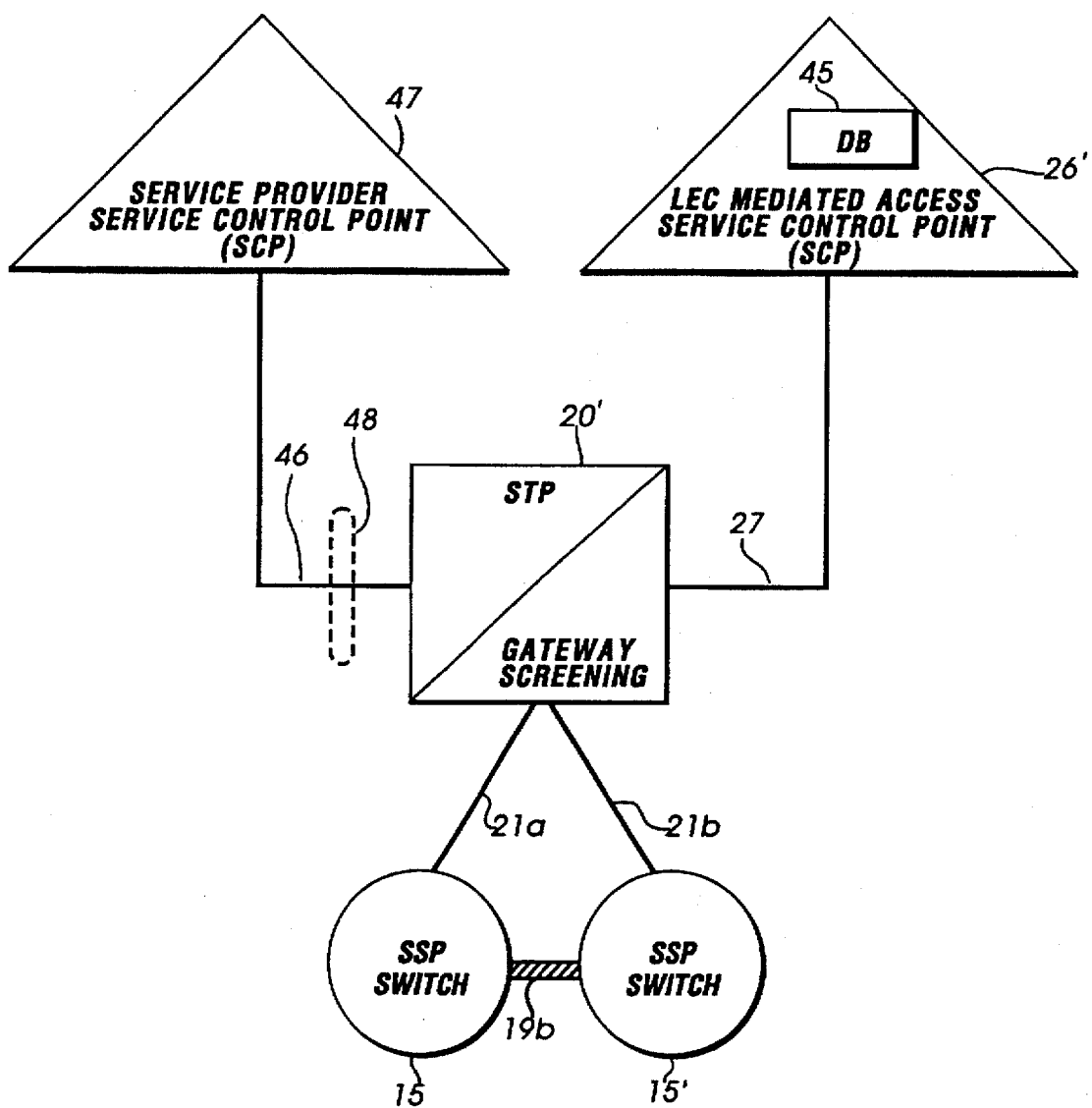
FIG. 2 is a block diagram of the apparatus that implements the preferred embodiment of the present invention.

Turning next to the drawing figures in which like numerals reference like parts and steps, the preferred embodiment of the present invention now will be described. FIG. 2 shows a block diagram of the apparatus that implements the preferred embodiment, and illustrates a subset of the typical AIN network elements shown in FIG. 1, which was discussed above in connection with the Background of the Invention.

In particular, FIG. 2 illustrates two service switching points (SSPs) 15 and 15' with their associated switches being interconnected by trunks 19b. Each of the SSP logical nodes at these switches are connected by SS7 data links 21a and 21b, respectively, to a signal transfer point (STP) 20'. Preferably, and as is now common for reliability purposes, STPs are deployed in mated pairs. Therefore, STP 20' is deployed for reliability purposes as a mated pair with each STP having its own set of SS7 data links. However, for ease of illustration, only one of the mated pair of STPs and one set of the SS7 data links is illustrated in FIG. 2. As used herein, a numeral referenced with a prime indication refers to a device that is very similar to its previously introduced counterpart, but that has some functionality added for the purpose of being used to implement the present invention. In FIG. 2, certain gateway screening functions described below in connection with FIGS. 3–4, have been added to STP 20' to implement the present invention. A "gateway" is an entrance into and exit from a communications network. Referring to FIG. 2, STP 20' is the gateway to the Advanced Intelligent Network (AIN), such as shown in FIG. 1, for a service provider through service provider service control point (SCP) 47.

STP 20' is connected via SS7 data link 27 to the local exchange carrier (LEC) operated mediated access service control point (SCP) 26'. As with STP 20', mediated access SCP 26' preferably is deployed for reliability purposes as a mated pair of SCPs with each of the pair having its own set of SS7 data links. However, for ease of illustration, only one of the mated pair SCPs and one set of the SS7 data links is illustrated in FIG. 2. The mediated access SCP 26' is physically the same as SCP 26 shown in FIG. 1, and therefore has a computer. However, the computer of the mediated access SCP 26' includes program instructions for executing certain steps of the preferred embodiment described below in connection with FIGS. 3, 5 and 6. The computer (not shown separately) of mediated access SCP 26' also has a database 45 that includes customer records as in the prior art and includes service provider records for effecting the present invention.

STP 20' is connected via another SS7 data link 46 to service provider SCP 47. Generally, service provider SCP 47 may be operated by any entity that provides any form of switched telephony service, although service provider SCP 47 often represents an SCP operated by an entity other than the local exchange carrier whose network is illustrated in FIG. 1. FIG. 2 further illustrates the interface between the service provider SCP 47 and the existing AIN as a point 48 along SS7 data link 46.

The embodiment illustrated in FIG. 2 executes the steps illustrated in FIGS. 3–5 described below. The flow of data packets containing Advanced Intelligent Network messages is described in connection with FIG. 2, and the steps in the mediation process are described in detail in connection with FIGS. 3–6. Mediation in the embodiment of FIG. 2 takes place both at the gateway screening functions of STP 20' and at mediated access SCP 26'.

In general, there are two flow paths for a data packet in the embodiment of the present invention illustrated in FIG. 2: (1) From SSP 15–15' to STP 20' to mediated access SCP 26' to STP 20' and then to service provider SCP 47; and (2) From service provider SCP 47 to STP 20' to mediated access SCP 26' to STP 20' and then to SSP 15–15'.

Generally, call-related data packets initially follow the first flow path, and after a response is obtained at service provider SCP 47, call-related data packets subsequently follow the second flow path. On the other hand, generally, non-call related data packets initially follow the second path, and after a response is obtained from an Advanced Intelligent Network element, non-call related data packets subsequently follow the first flow path. Whether the data packet is a call related data packet or a non-call related data packet, the origination point of the data packet (SSP 15–15' or service provider SCP 47, in FIG. 2) determines the sets of mediation steps that the data packet encounters in the flow path. Generally, a data packet originating at a non-local exchange carrier source such as service provider SCP 47 encounters one principal set of mediation steps at STP 20' and another principal set of mediation steps at mediated access SCP 26'. It should be noted that the data packet may encounter mediation steps at other points, but that such mediation involves few steps as compared to the mediation steps described herein. For example, SSPs 15–15' may include mediation steps to validate the protocol structure of incoming AIN messages. However, a data packet originating at a network element such as SSP 15–15' encounters a principal set of mediation steps only at mediated access SCP 26'. A data packet originating at a network element encounters only one principal set of mediation steps because the network origination point of the data packet is perceived as secure with respect to the integrity of the Advanced Intelligent Network, thereby obviating the necessity of further mediation at STP 20'.

Referring still to FIG. 2, the two flow paths are illustrated by reference to an example of call-related data packets. The initiation of the first flow path for a data packet begins when a customer, who has previously selected the service provider associated with SCP 47, and whose subscriber line is connected to SSP 15, takes his/her telephone off hook. SSP 15 generates a trigger in response thereto. The trigger is an Advanced Intelligent Network data packet that contains a message indicating that the telephone associated with a particular directory number has gone off hook. This data packet is passed from SSP 15 over SS7 data link 21 a to STP 20', which routes the data packet over data link 27 to mediated access SCP 26'. When the data packet is received by the mediated access SCP 26', a set of mediation steps is performed. These steps are described below in connection with FIGS. 3, 5 and 6. If mediation is successful, mediated access SCP 26' further routes the data packet over SS7 data link 27 to STP 20'. The data packet then is forwarded by STP 20' over SS7 data link 46 to service provider SCP 47.

The initiation of the second flow path begins when service provider SCP 47 generates a data packet responsive to the data packet that service provider SCP 47 received from mediated access SCP 26'. The responsive data packet is addressed to SSP 15 and contains information regarding the next appropriate action to be taken in the processing of the call. In most cases, the next step is to provide a dial tone to the customer. The service provider SCP 47 sends the responsive data packet to STP 20' over data link 46. When the data packet from the service provider SCP 47 is received, STP 20' performs a set of mediation steps. These mediation steps are described below in connection with FIGS. 3 and 4. If the mediation is successful, STP 20' sends the responsive data packet over SS7 data link 27 to mediated access SCP 26'. The responsive data packet again encounters a set of mediation steps at the mediated access SCP 26'. These mediation steps are described below in connection with FIGS. 3, 5 and 6. If this mediation is successful, the mediated access SCP 26' sends the responsive data packet over SS7 data link 27 to STP 20', which, in turn, sends the responsive data packet over SS7 data link 21a to SSP 15 for further call processing.

As described in greater detail in connection with FIGS. 3 and 4, conditions may arise such that STP 20' terminates its receipt of data packets across interface 48, or such that service provider SCP 47 stops generating appropriate responsive data packets. The present invention applies default applications in the absence of the network's ability to communicate effectively with service provider SCP 47. In the absence of such default applications, SSPs 15–15' would be completely dependent on their internal default applications and SSPs 15–15' would be stepped through these applications only in response to timeouts of internal timers operated with the respective SSP. These timers limit the amount of time an SSP will wait for a reply to a previously transmitted outgoing message.

A wide range of choices for the default applications will be apparent to those skilled in the art. However, the most common default application will be the provision of plain old telephone service (POTS). In an embodiment, the present invention provides that all discarded initial queries result in a disconnect response message, unless the service provider has selected a different default response. Optionally, the present invention provides that all discarded initial queries are provided with a selected default response from the mediated access SCP 26'. The specific default response may be a continuance of call processing such as for originating triggers, may be a connection of the call such as for terminating attempt triggers, may be the playing of an announcement, or may be the disconnection of the call. Further, the selected default response may be assignable on a trigger/Directory Number basis. The provision of default applications that will respond with appropriate instructions to data packets from SSPs 15–15' significantly reduces the extent to which a caller using the Advanced Intelligent Network is made vulnerable to equipment failures or abuse on the service provider side of interface 48.

Reference to FIG. 2 will be made in connection with the flow chart descriptions of the method of the present invention to follow.

Figure 3:
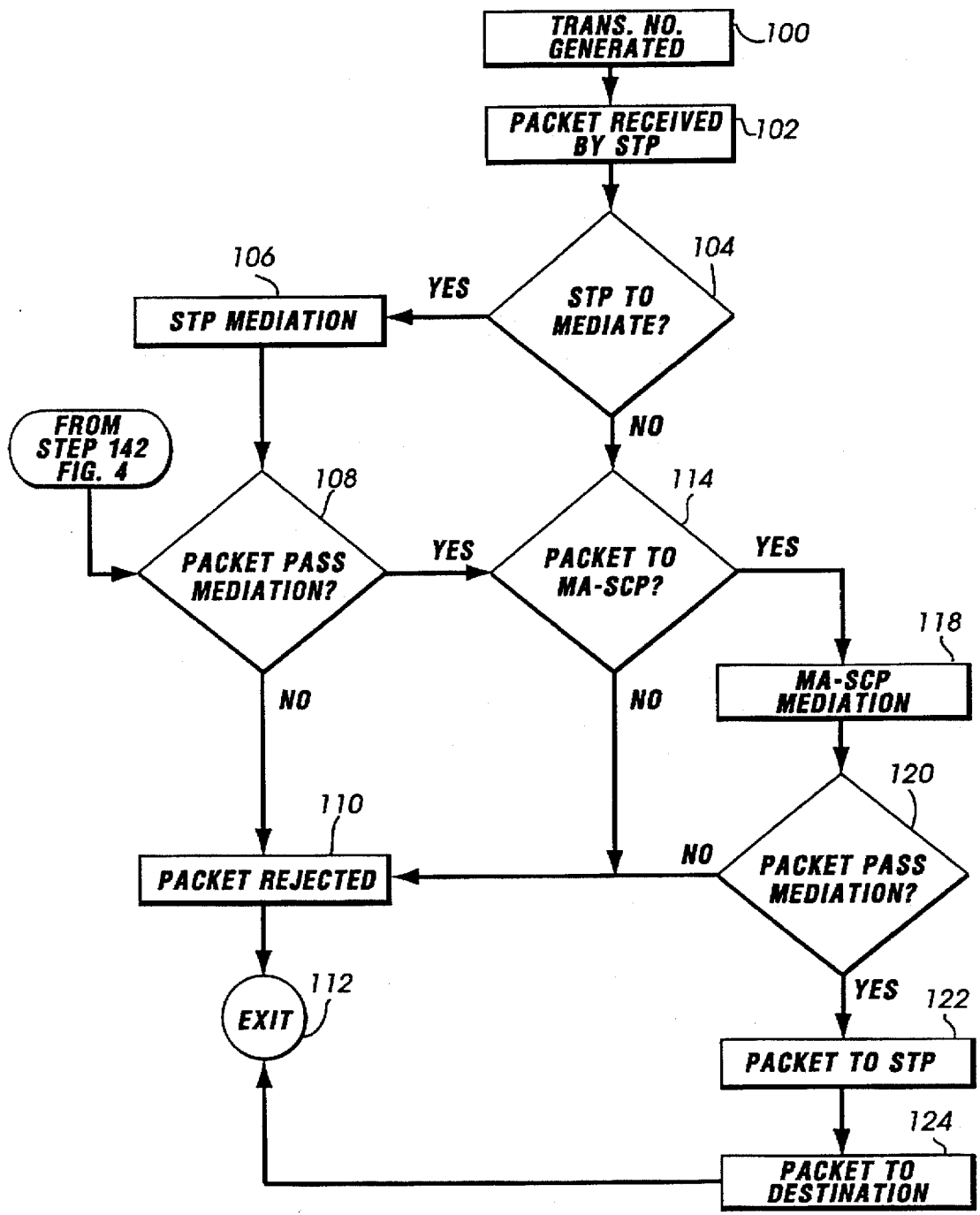
FIG. 3 is a flow chart for the flow of data packets between elements in accordance with the preferred embodiment.

FIG. 3 is a flow chart that illustrates the method of the present invention whether the data packet originates at service provider SCP 47 or at a network element such as SSP 15–15'. By way of background, the flow of data packets between network elements in processing a call is referred to as a conversational message sequence if the flow involves more than one query and associated response message. With conversational messages, a sequence of messages (data packets) passes back and forth between elements in the call processing. All of the data packets in a message sequence are Transaction Capabilities Application Part (TCAP) messages. A TCAP message is an SS7 subprotocol which provides for transfer of non-circuit related information between signaling points. As is known to those skilled in the art, the first message of a message sequence is denominated in the SS7 protocol as a query or a query message. Triggers generated by SSPs such as SSP 15–15' are the most common form of queries. However, queries also may be generated by the SCP of a service provider such as service provider SCP 47. Generally, a service provider SCP generates a query only in the context of a non-call related message. Such non-call related messages may include Automatic Call Gap, Update_Request, Monitor_for_Change messages, and SCP-to-SCP query/response messages.

In the present invention, as illustrated at step 100 in FIG. 3, an element originating a query assigns a first transaction number to the query. Transaction numbers already are in use in the Advanced Intelligent Network, and in particular, have been generated generally by SSPs to identify a particular SSP transaction. A first transaction number is unique to its originating element, but the number may be identical to other transaction numbers generated by other elements throughout the Advanced Intelligent Network. Thus, a service control point may handle message sequences that originate with different SSPs, but that have identical first transaction numbers. However, as will be explained below in connection with FIG. 5, a service control point distinguishes a message sequence by concatenating the first transaction number received from an SSP with other information such as the Originating Point Code of the SSP.

As noted above, queries also may be generated by the SCP of a service provider in the context of non-call related messages. In the present invention, service provider SCP 47 assigns a first transaction number to a query by assigning a currently unused random number (or pseudo random number) to the query.

Referring again to FIG. 3, after the first transaction number has been generated by the originating element, in step 102 the data packet associated with the first transaction number is passed to and received by an STP such as STP 20'. Referring to FIG. 2, if the data packet originates with service provider SCP 47, then the data packet is passed over SS7 data link 46 to STP 20'. If the data packet originates with SSP 15–15', the data packet is passed over either SS7 data link 21a or 21b, respectively. In step 104, STP 20' determines whether mediation with respect to the data packet must be conducted. As noted above, a data packet originating at an Advanced Intelligent Network element such as SSP 15–15' is not mediated by STP 20' because it is perceived that data packets that originate with Advanced Intelligent Network elements are secure with respect to the integrity of the Advanced Intelligent Network. Thus, if a determination is made that STP 20' does not have to conduct mediation, the method proceeds to step 114 described below. If a determination is made that STP 20' conduct mediation, in step 106 STP 20' conducts such mediation. Mediation by an STP such as STP 20' is described below in connection with FIG. 4. In step 108, a determination is made whether the data packet has passed STP mediation. If not, in step 110 the data packet is rejected, and the routine is exited at point 112 after rejection of the message.

If the data packet has passed STP mediation, in step 114 a determination is made as to whether the data packet is to be provided to mediated access SCP 26'. If not, in step 110 the data packet is rejected, and the routine is exited at point 112 after rejection of the message. If the data packet is to be provided to mediated access SCP 26', the data packet is passed over SS7 data link 27 to and received by mediated access SCP 26'. In step 118, mediated access SCP 26' conducts a mediation with respect to the data packet. The mediation is described further in connection with FIGS. 5 and 6. After mediation, in step 120 a determination is made whether the data packet has passed mediation. If not, in step 110 the data packet is rejected, and the routine is exited at point 112 after rejection of the message. As noted above in connection with FIG. 2, preferably the present invention provides a default application in connection with the rejection of a data packet.

If the data packet has passed mediation, in step 122 the data packet is passed over SS7 data link 27 to STP 20', and then in step 124, STP 20' passes the data packet to the specified destination. Preferably, prior to passing the data packet to service provider SCP 47, mediated access SCP 26' confirms that service provider SCP 47, or the particular service provider service requested in the data packet, is in service. If the desired service provider SCP 47 or the particular service provider service is out-of-service, mediated access SCP 26' rejects the data packet, and if applicable, provides a default application as explained above. Referring again to FIG. 2, if the destination for the data packet is SSP 15–15', STP 20' passes the data packet over SS7 data link 21a–b, respectively, to SSP 15–15'. If the destination is service provider SCP 47, STP 20' passes the data packet over SS7 data link 46. In step 112, the routine is exited.

Figure 4:
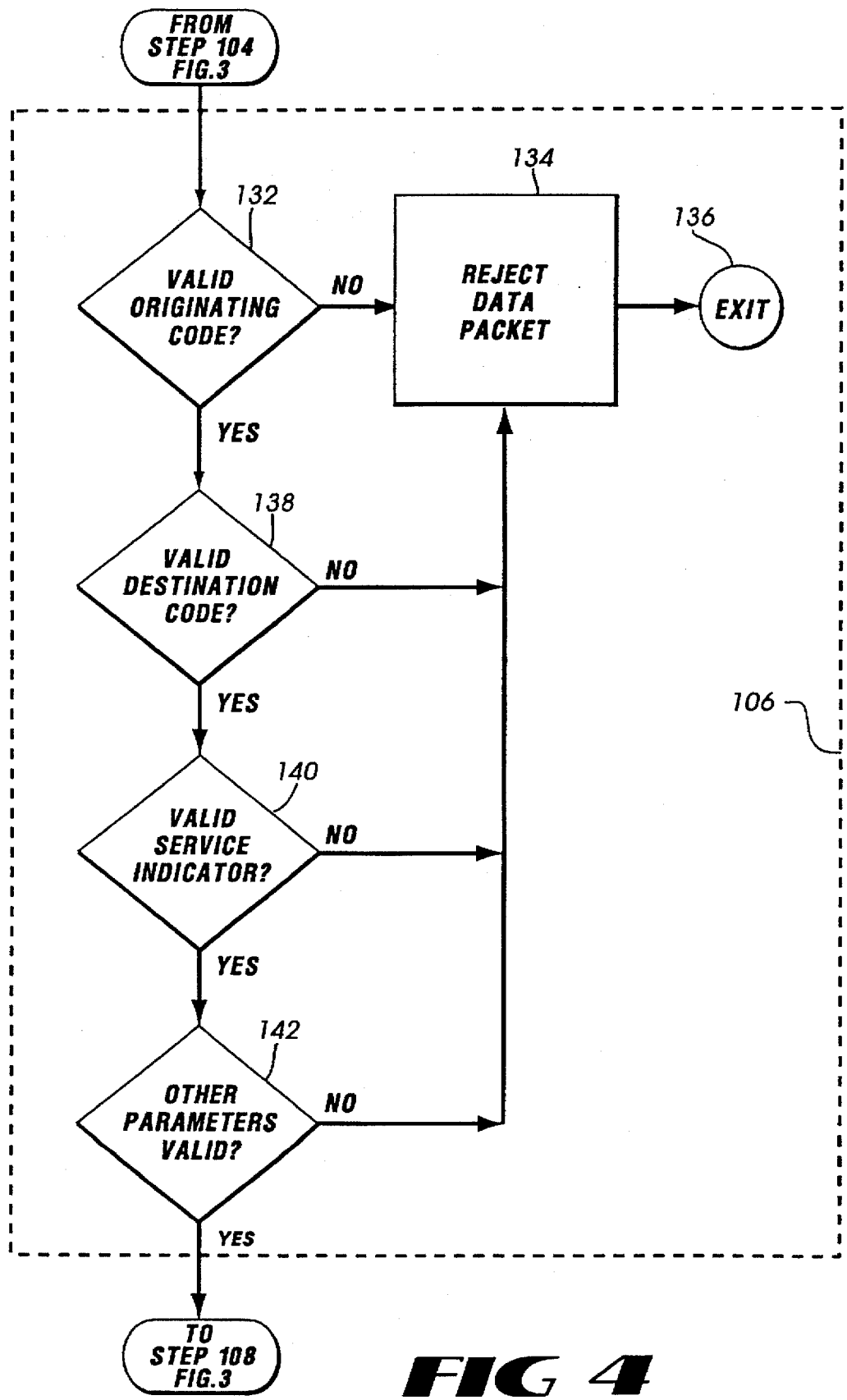
FIG. 4 is a flow chart that illustrates mediation steps performed by a service transfer point in accordance with the preferred embodiment.

FIG. 4 is a flow chart that illustrates the preferred mediation steps performed by STP 20' as part of step 106. As noted above, mediation steps are performed by STP 20' only if the data packet originated with a non-local exchange carrier network element such as service provider SCP 47. Generally, the mediation steps performed by STP 20' comprise a validation of origination and destination SS7 protocol addresses. In particular, the present invention implements mediation at STP 20' through the use of gateway screening techniques already in use at STPs in the Advanced Intelligent Network. Through gateway screening, an STP forwards or rejects a received data packet based on an examination of address and header information in the data packet and comparison of that examined information with respect to information stored by the STP. As is well known to those skilled in the art, in gateway screening an STP generally examines one or more of the following types of information in the fields or parameters of the data packet: Originating Point Code, Destination Point Code and Global Title Address. Based on the information in the data packet, the STP routes the data packet according to the destination information. Thus, in the prior art, many different destinations were accepted by an STP for purposes of routing a data packet. However, in the present invention, the STP only accepts the assigned mediated access SCP as a valid destination for a data packet. In the present invention, gateway screening at STP 20' is used to force the service provider to route a data packet from service provider SCP 47 through STP 20' and through mediated access SCP 26'. Failure to follow this routing requirement results in rejection of the data packet by STP 20'.

FIG. 4 illustrates that in the preferred embodiment in step 132 STP 20' identifies the sender of the data packet by checking the validity of a first parameter in the data packet. In particular, the STP 20' preferably checks whether the Originating Point Code (also referred to as the sender identifier) in the data packet corresponds to the port identifier for the service provider SCP 47 to confirm that the data packet has been received from an authorized provider of data packets. In other words, STP 20' stores a record of the association of the physical port of interface 48 with the particular service provider that is authorized to operate an SCP on SS7 data link 46. If the sender identifier does not correspond to the authorized provider of data packets on the recipient port, it is inappropriate for STP 20' to allow the data packet into the Advanced Intelligent Network because the data packet represents itself to have been originated from one entity, yet should not have been generated by that entity because of the port through which it is trying to enter the AIN. Thus, if the Originating Point Code is invalid, in step 134 the data packet is rejected, and in step 136 the routine is exited.

If the Originating Point Code is valid, then in step 138 STP 20' checks the validity of a second parameter in the data packet. In particular, STP 20' preferably checks the Destination Point Code (also referred to as the destination address) against the identity of the sender. If the Destination Point Code or destination address is for a network element with which the service provider SCP 47 is not allowed to communicate, the data packet is rejected. In particular, STP 20' preferably checks whether the Destination Point Code corresponds to the Point Code of STP 20', to the alias Point Code of STP 20', or to the Point Code or alias Point Code of mediated access SCP 26'. If the Destination Point Code is invalid, in step 134 the data packet is rejected, and in step 136 the routine is exited.

If the Destination Point Code is valid, then in step 140 STP 20' checks the validity of a third parameter in the data packet, and in particular, preferably checks whether the Service Indicator is valid. In the preferred embodiment, a valid Service Indicator corresponds to a Message Transfer Part (MTP), a Signaling Connection Control Part (SCCP), or to a test message. In addition, legal values for the Service Indicator parameter (or field) are defined in "Specification of Signaling System Number 7", Section T1.111.4., TR-NWT-000246, Issue 2, Vol. I (June 1991) published by BellCore, New Jersey.

In the preferred embodiment, in step 142 STP 20' continues to check the validity of certain additional parameters if the check in step 140 results in a determination that the service indicator corresponds to a Signaling Connection Control Part (SCCP). In particular, STP 20' checks the Calling Party Address, Called Party Address, and the Global Title Translation. The Calling Party Address must correspond to a legal Point Code, Subsystem Number combination for service provider SCP 47, or the Directory Number (DN) assigned to service provider SCP 47. With respect to the Called Party Address, if routing is based on a Point Code and Subsystem Number is indicated, the Point Code must be that of mediated access SCP 26', and the Subsystem Number must be that of the mediation application program. If Global Title Translation is indicated, the Translation Type in the Called Party Address field must be the Advanced Intelligent Network Open Access Translation type. Further, if STP 20' performs Global Title Translation, the resulting Destination Point Code and Subsystem Number must be that of the mediated access SCP 26', and the subsystem number must be that of the mediation application program.

In addition, other checking steps not illustrated in FIG. 4 may be made by STP 20' for any alternate routing that may be necessary. As is well known to those skilled in the art, these alternate routing steps simply constitute a process for determining whether certain switching nodes within the network are inoperative and whether alternate address routing needs to be employed.

Figure 5A:
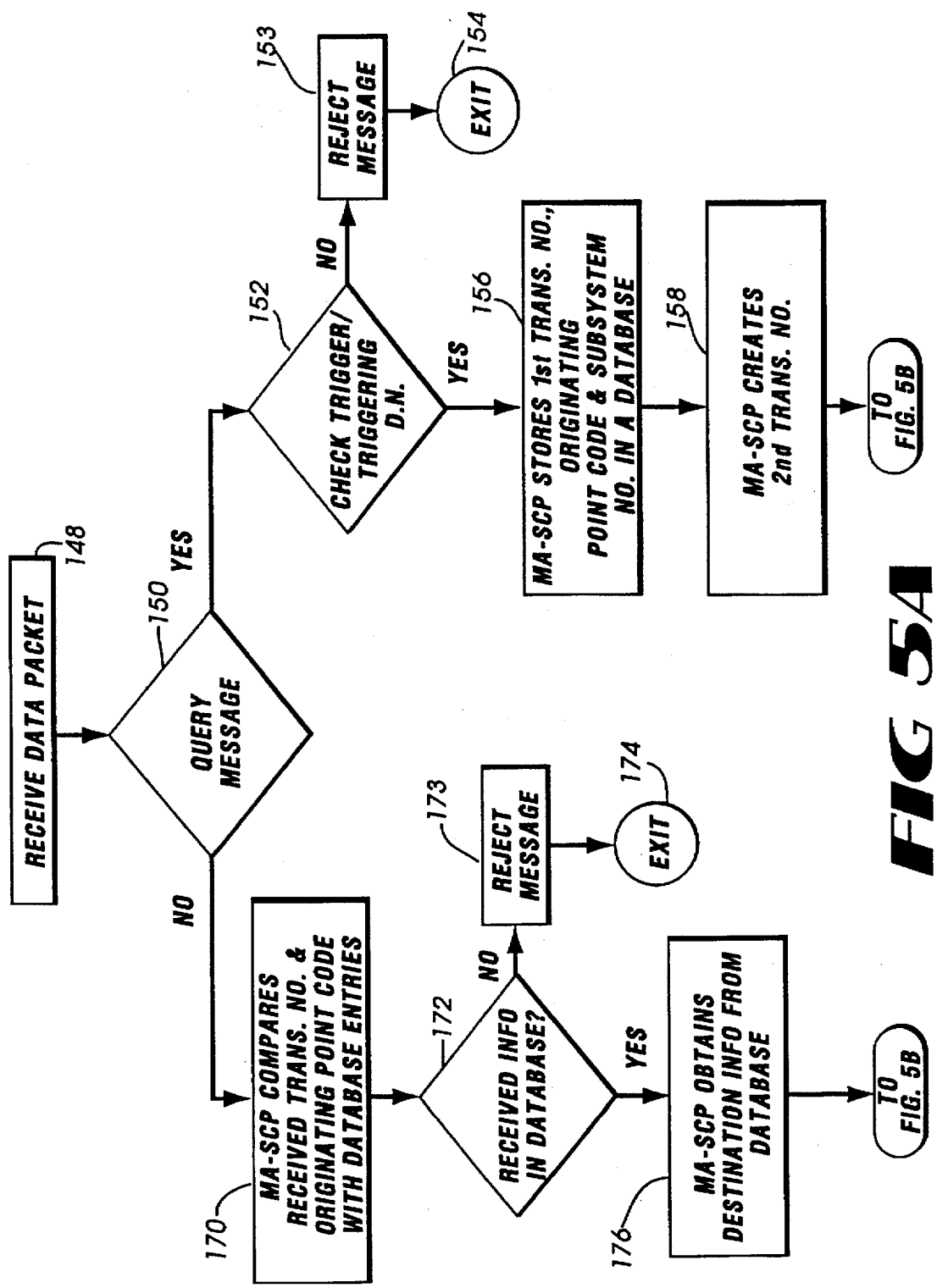
FIG. 5 is a flow chart that illustrates the handling of data packets received by a mediated access service control point in accordance With the preferred embodiment.
Figure 5B:
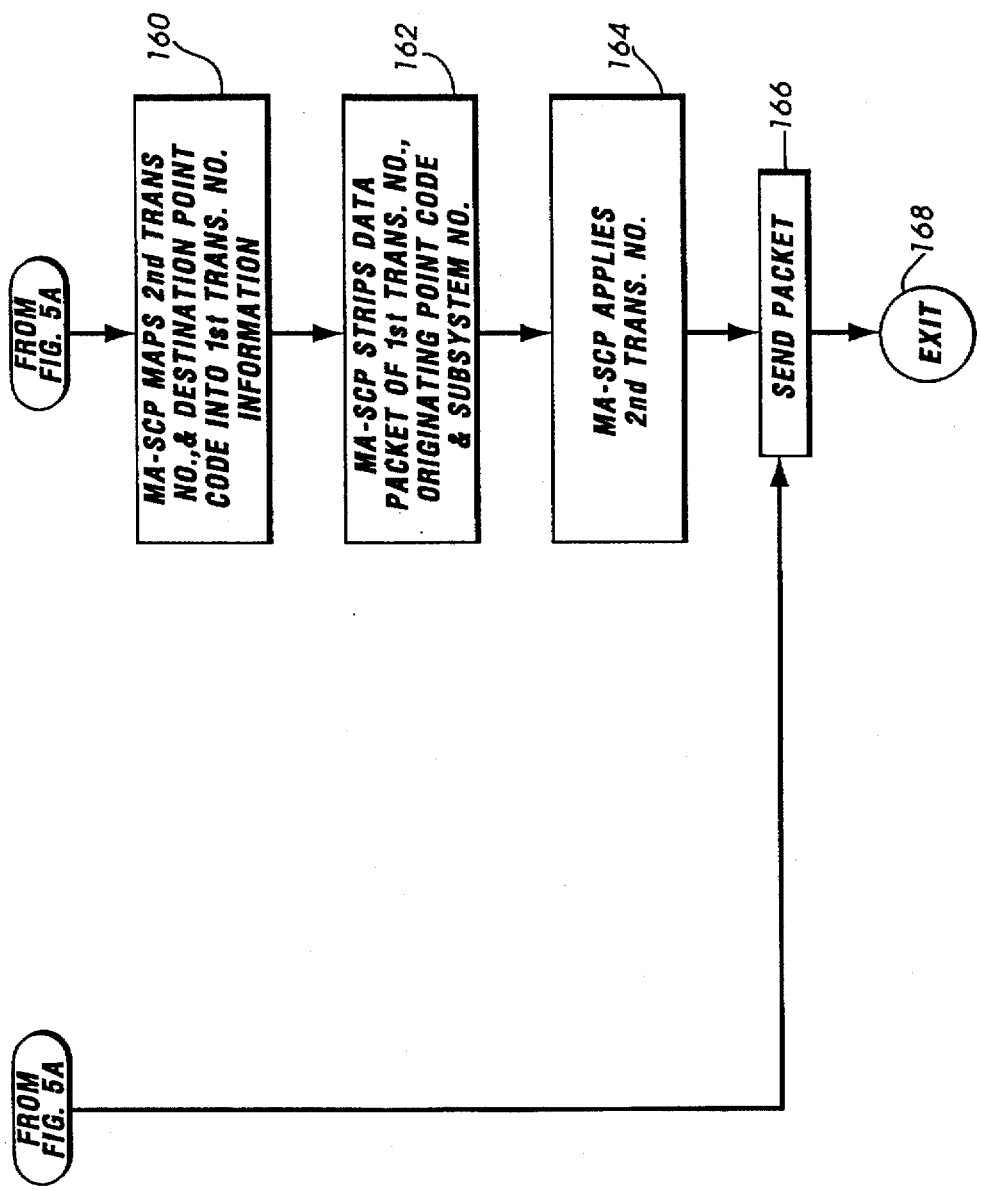

FIG. 5 is a flow chart that illustrates the handling of data packets received by mediated access SCP 26'. Generally, the mediation steps performed by mediated access SCP 26' comprise an examination of the Advanced Intelligent Network portions of SS7 protocol data packets that are received by mediated access SCP 26'. In step 148, the mediated access SCP 26' receives a data packet. The data packet received by the mediated access SCP 26' may be a call related data packet or a non-call related data packet, a query, a response message, or other conversational message. Further, the data packet may be received from a service provider such as service provider 47 or from a network element such as SSPs 15–15'.

After receipt of the data packet, the mediated access SCP 26' executes decisional step 150 at which mediated access SCP 26' determines if the data packet includes a query (also referred to as a query message), i.e., whether the data packet is the first message in a new transaction or message sequence. The query may be received from a network element such as SSPs 15–15', or from a service provider SCP such as service provider SCP 47. If the data packet includes a query, in step 152 the mediated access SCP 26' uses the information included in the data packet to look up information in its database 45 for routing and further processing of the call. For example, if the data packet includes a query from SSPs 15–15', in step 152 the mediated access SCP 26' uses the information in the data packet to look up the particular service provider SCP that handles the particular trigger for the particular triggering directory number identified in the message. The trigger and the triggering directory number uniquely identify the service provider to whom the data packet is to be routed. In particular, if the data packet is received from a network element such as SSPs 15–15', mediated access SCP 26' preferably must be able to use its database 45 to map the triggering directory number/trigger type pair into the SS7 protocol address of the service provider SCP that is to provide the service expected by the customer. This requisite mapping is a check of the service provider's authorization to receive the query. This check ensures that a service provider receives data packets only for its customers, thereby assuring the privacy and security to the customers of all participating service providers. Thus, the mediated access SCP 26' preferably maintains information in database 45 of the directory numbers of all of the customers for each of the service provider SCPs operating in the system and information regarding the network elements that each of the service provider SCPs are authorized to access. If the query originates with an SCP, the directory number in the called party address field of the query must match an entry in database 45 of mediated access SCP 26'. This ensures that each service provider influences only its own customers. In the preferred embodiment, the service provider SCP address is a point code and subsystem number for message transfer part (MTP) routing if intra-local access and transport area (LATA) routing is used. If inter-LATA routing is necessary, the service provider SCP address is an inter-network translation type and global title value.

As noted hereinabove, one constraint of the present invention is that for each directory number, each trigger can invoke only one service provider. Thus, it should be understood that the results of the look-up indicated at step 152 could be that this particular trigger for this particular directory number is serviced by either one service provider such as through service provider SCP 47, or a local exchange carrier such as through a local exchange carrier by a local service control point such as SCP 26 shown in FIG. 1.

If database 45 of mediated access SCP 26' does not include information corresponding to the trigger of the received data packet, the data packet is rejected in step 153 and the routine is exited at point 154. If database 45 does include such information, then in step 156 mediated access SCP 26' stores the first transaction number, the originating point code and the subsystem number associated with the data packet in database 45. Preferably, the first transaction number, the originating point code and the subsystem number comprise a first transaction identifier for the data packet. This first transaction identifier is created by the concatenation of the first transaction number, the originating point code and the subsystem number. This stored information is consulted by mediated access SCP 26' in connection with the mediation of responses and other messages as described below in connection with steps 170–176.

In step 158, mediated access SCP 26' creates a second transaction number to be associated with the data packet for use in the data signaling path between the mediated access SCP 26' and service provider SCP 47 or in the signaling path between the mediated access SCP 26' and network element such as SSPs 15–15'. This second transaction number is used in place of the first transaction identifier stored in database 45. In the present invention, mediated access SCP 26' assigns a currently unused second transaction number to the data packet by assigning a currently unused random number (or pseudo random number) to the data packet. Mediated access SCP 26' obtains the random number from a pseudo random number generator as is well known to those skilled in the art. "Currently unused" random number means that mediated access SCP 26' keeps track of the random numbers that have been assigned to data packets in progress through the network. Mediated access SCP 26' consults a list or table in its database 45 prior to assigning a random number to the data packet to make sure that the selected random number does not duplicate the random number of a data packet in progress.

Preferably, mediated access SCP 26' stores the assigned second transaction number in the aforementioned list or table in database 45. The use of a random number as the second transaction number for the data packet makes certain that the second transaction number is in no way correlated to the first transaction number. In this way, the second transaction number provides no information to a recipient of the data packet. The use of a random number as the second transaction number prevents a message originator from computing transaction numbers likely to be used by competitors and then attempting to control the calls of competitors' customers. This random number use also prevents a message originator from guessing the transaction numbers assigned to a competitor's calls by analyzing the transaction numbers assigned to its own calls.

After mediated access SCP 26' creates a second transaction number, in step 160 mediated access SCP 26' maintains in database 45 a map of the second transaction number into the first transaction identifier. In the preferred embodiment, the mediated access SCP 26' also enters the second transaction number into a table in database 45 associated with the destination point code of the data packet. If the destination of the data packet is service provider SCP 47, the destination point code is the point code of service provider SCP 47. In addition, the preferred embodiment associates the destination point code of the data packet with the second transaction number and maintains a map of this combination of information to the first transaction identifier. Furthermore, in connection with SCP-originated messages, the mediated access SCP 26' must map the directory number in the called party address field of the initial message to the destination point code and subsystem number of the target network element. This ensures that the destination party is actually a customer of the service provider.

In step 162, mediated access SCP 26' strips the data packet of the information corresponding to the first transaction identifier, and in step 164 mediated access SCP 26' applies the second transaction number to the data packet. By the substitution of the second transaction number for the first transaction identifier, the integrity of the Advanced Intelligent Network is maintained because such substitution makes it difficult, if not impossible, to gain any telecommunications transaction information from the data packet. After stripping the first transaction identifier and substituting the second transaction information, the modified packet is sent to its destination at step 166 and the routine is exited at point 168.

Referring again to step 150, if the received data packet is not a query, the data packet corresponds to a response (also referred to as a response message or a conversational message). For a valid response or conversational message, the data packet should include the second transaction number assigned to the data packet originally by the mediated access SCP 26'. Thus, at step 170 mediated access SCP 26' compares the transaction number associated with the responsive data packet and compares the transaction number to the list of active second transaction numbers maintained in database 45.

In the preferred embodiment, in connection with a response received from service provider SCP 47, mediated access SCP 26' makes another comparison. Mediated access SCP 26' compares certain information in the response with certain information in database 45 that was stored as a result of receipt of the query corresponding to the response message. In particular, mediated access SCP 26' compares the following information in the response—the received transaction number and SS7 originating address (or point code) of the service provider SCP 47—with the following information in database 45—the second transaction number and the destination point code of the data packet when it was a query. The compared transaction numbers and the point codes preferably must match for mediation to continue. By the double check of the preferred embodiment involving a necessary correspondence between transaction numbers and between point codes associated with service provider SCP 47, the present invention offers distinct advantages. This double check system protects against the abuse of unintended direct routing of service provider responses to SSPs (e.g., due to an error in the local exchange carrier's STP routing tables), and protects against "back-door" SS7 protocol circuits.

Referring again to FIG. 5, in step 172 mediated access SCP 26' checks whether the information associated with the received data packet corresponds to the information in database 45, as explained above. If not, the lack of correspondence means that a non-query message has been received from an Advanced Intelligent Network element employing an invalid transaction number. In this case, the data packet is rejected in step 173 and the routine is exited at step 174.

If the received information corresponds to the stored information, in step 176 mediated access SCP 26' obtains from database 45 the first transaction identifier corresponding to the received (second) transaction number. Upon recall of the first transaction identifier, mediated access SCP 26' has obtained further routing or destination information for the data packet. This destination information may include a point code and subsystem number, or an inter-network translation type and global title value. Mediated access SCP 26' strips the received data packet of its address information, and adds the destination information obtained from database 45 so that the data packet may be returned to the SSP or other element from which the earlier data packet originated. The routine proceeds to send the modified packet in step 166 and to exit in step 168.

In an embodiment, the present invention conducts additional comparison or validation steps to determine that the responsive data packet corresponds to the data packet that initiated the transaction. These additional validation steps include unpacking of each responsive TCAP message and examination of each of the specific parameter values to determine that the parameter values correspond to the corresponding specific parameter values in the initial data packet. Mediation steps are required only for a parameter which did not exist in the initial data packet or whose value has been changed by the service provider. Thus, in order to accomplish examination of the changes in the parameter values of a responsive data packet from the parameter values in the initial data packet, mediated access SCP 26' maintains a record of the parameter values of an initial data packet in database 45.

Figure 6A:
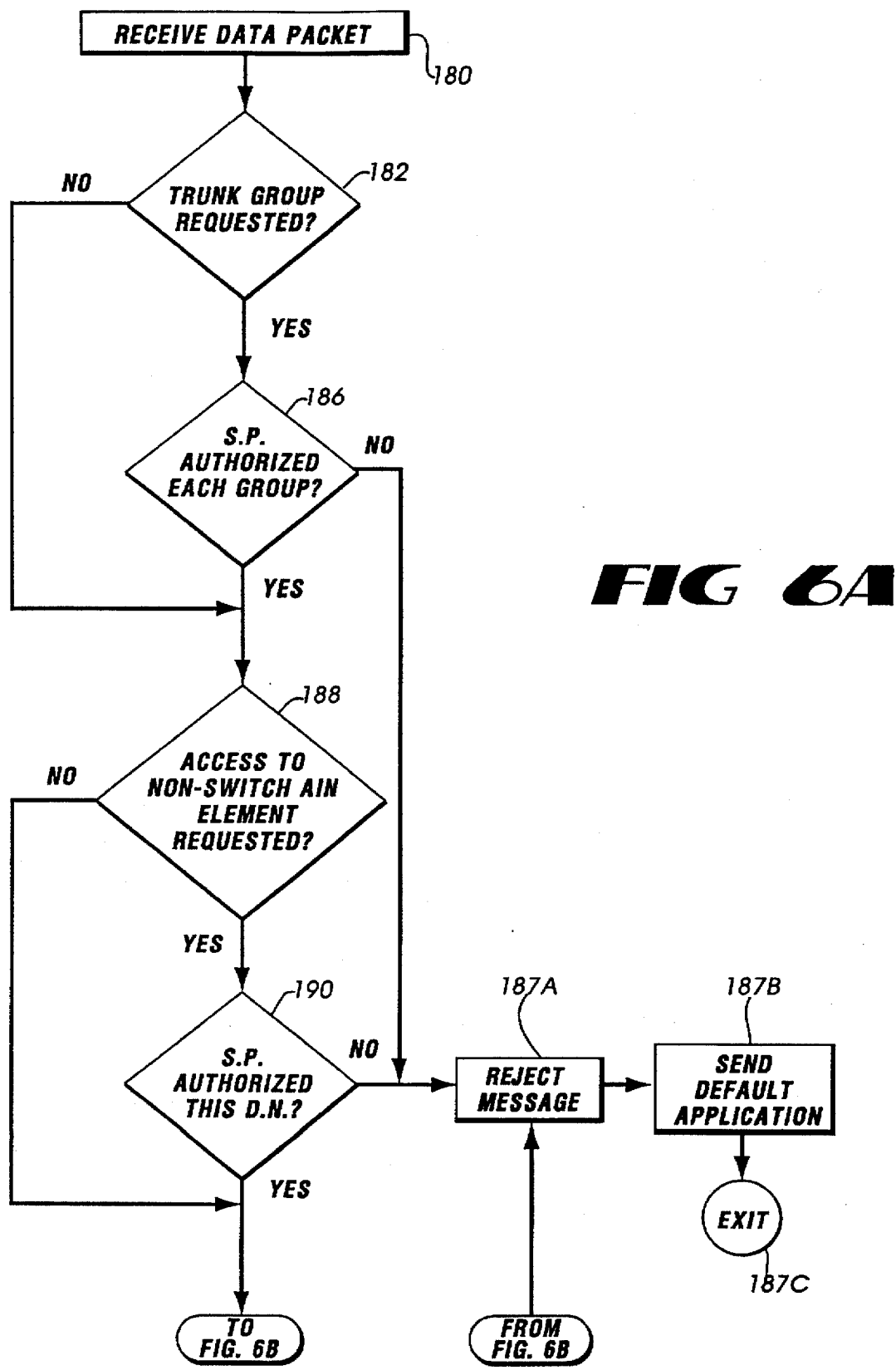
FIG. 6 is a flow chart that illustrates mediation steps performed by a mediated access service control point in accordance with the preferred embodiment.
Figure 6B:
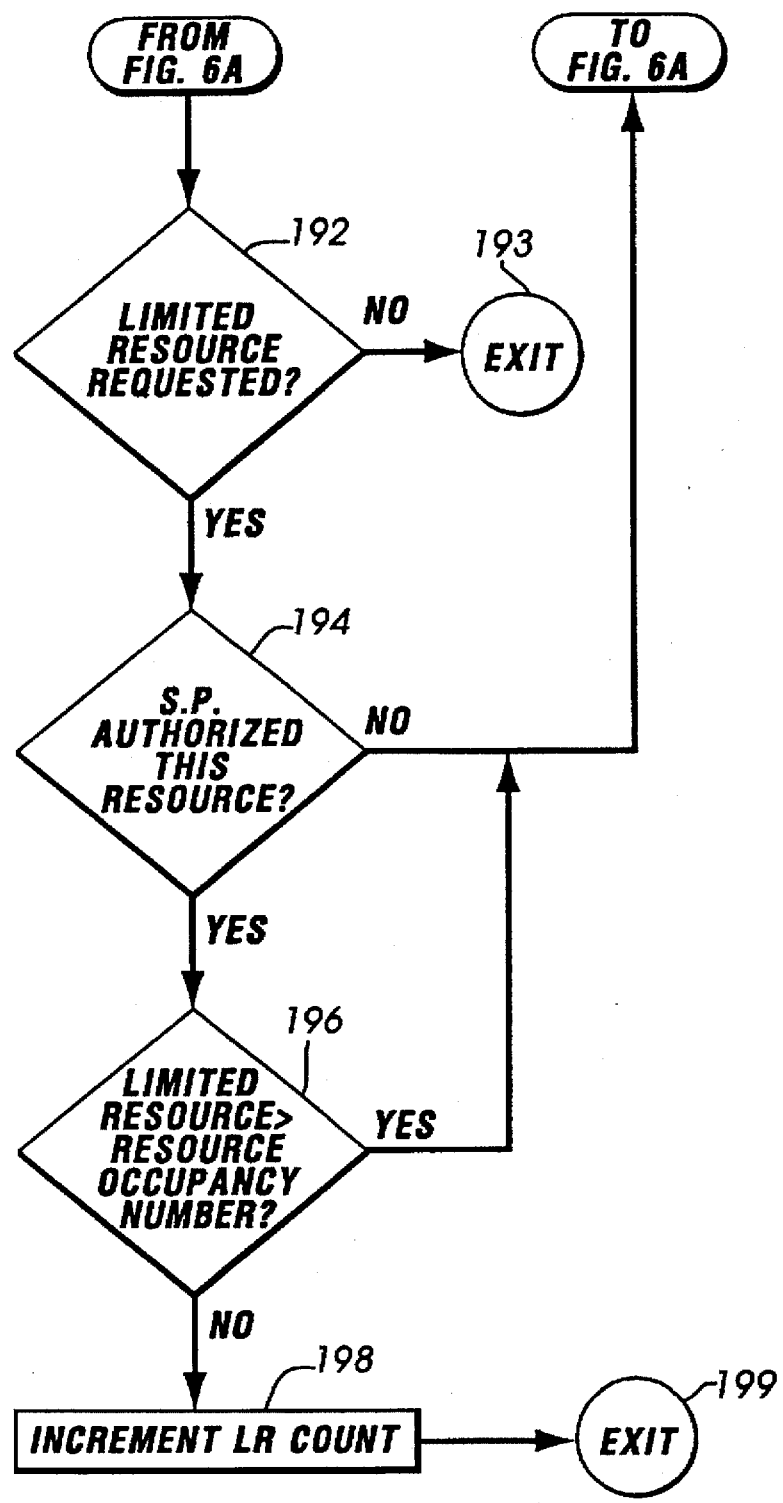

FIG. 6 is a flow chart that illustrates mediating processes executed by the preferred embodiment for particular types of Advanced Intelligent Network messages. It should be understood that the steps illustrated are executed by mediated access SCP 26'. The inquiries with respect to authorized activities are stored in various tables of database 45 (FIG. 2). This portion of the mediation process is entered at step 180 where the mediated access SCP 26' receives a data packet. In step 182, mediated access SCP 26' checks whether there is any request for a particular trunk group routing in the data packet. If no trunk group is requested, NO branch is taken to step 188 to loop around the test for a valid trunk group request 186. If one or more trunk groups are requested, at step 186 mediated access SCP 26' checks a table of legal trunk group route indices for the particular service provider that generated the data packet and for the SSP for which the data packet is destined.

This test for a valid trunk group is conducted for each trunk group that is specified in the request since multiple trunk groups, that may be used in the alternative, may be specified in a request for trunk group routing. If any one of the requested trunk groups is not authorized for use by this service provider SCP, NO branch is taken from step 186, which leads to rejection of the data packet in step 187A, provision of a default application in step 187B (optional) and exit of the routine in step 187C. If the service provider SCP is authorized to use each trunk group contained in the request for a trunk group routing, the process proceeds to the next step, which is step 188.

It should be noted that the preferred embodiment rejects the message in the event that any request for possible use of an unauthorized trunk group is detected. It is also possible to cause the mediated access SCP to reconstruct the data packet so as to delete the unauthorized trunk group, but include one or more trunk groups that the service provider SCP is authorized to use. However, it is considered preferable to place the burden of making proper requests for trunk group routing on the service provider.

In step 188, the data packet is tested to see if access to a non-switch Advanced Intelligent Network element is requested. As noted above, authorization to effect a call to a particular directory number implies authorization to communicate with the SSP associated with the switch that handles that directory number. However, a separate authorization test is included for data packets that seek access to a non-switch Advanced Intelligent Network element such as other service control points or service nodes.

As with previous tests, if no non-switch Advanced Intelligent Network element is requested, the NO branch from step 188 is taken to step 192 to loop around the authorization test 190. If the message request contains a request for access to a non-switch Advanced Intelligent Network element, YES branch is taken to step 190, at which a directory number table is consulted to determine if the directory number for the non-switch Advanced Intelligent Network element is included in a list of authorized directory numbers for this particular service provider SCP. It should be noted that it is preferable to store designations of the non-switch elements by their directory numbers, which have been conventionally assigned to non-switch Advanced Intelligent Network elements. The directory number is the preferred way of designating the non-switch element. This provides additional network security by eliminating the need for the service providers to know or to use SS7 point codes. In this instance, it should be noted that the directory number is not a directory number associated with a particular subscriber line or subscriber leased trunks as is the case with the directory number validation described above in connection with step 152 (FIG. 5).

Referring again to step 190, if the service provider SCP is not authorized to access the requested non-switch Advanced Intelligent Network element, NO branch is taken that leads to rejection of the message in step 187A, provision of default application in step 187B (optional) and to exit of the routine in step 187C. If the service provider SCP is authorized, YES branch is taken to step 192. In step 192, a check is made to determine if the data packet seeks use of a limited resource. The preferred embodiment defines a limited resource as at least one class of network resources of which there is some limited number, and a need to strictly control the time they are occupied by any given service provider. While the concept as used in this specification is not so limited, a limited resource will normally be a device that is involved in an audio connection to a call in real time to process some form of audio signal either provided by a caller or sent to a caller. The common characteristic of such devices is that they are employed for relatively long periods of time each time their use is invoked. In the preferred embodiment, switch digit receivers and voice announcement devices are classified as limited resources. However, other embodiments of the present invention may classify other devices as limited resources and indeed, there can be multiple hierarchical classes of resources defined for an implementation of the present invention.

If no limited resource is requested, the mediation tests have been successfully passed and NO branch is taken and the routine is exited in step 184. If a limited resource is requested YES branch is taken to step 194. This step tests whether the service provider SCP is authorized to use this resource or class of resources. If this test is failed, NO branch is taken to exit the routine in step 184. Referring again to step 194, if the service provider SCP is authorized to use the resource, YES branch is taken to step 196 that tests for an important mediation function of the preferred embodiment. Because the class of network resources defined as limited resources by the preferred embodiment includes devices that are typically occupied for long periods of time each time they are used, the method of the preferred embodiment places a limitation on the number of such devices that can be occupied simultaneously by a given service provider. This upper limit is referred to as a resource occupancy number, and is simply a predetermined number of the limited resource devices that may be occupied simultaneously by the service provider or its application.

It is believed preferable to select the resource occupancy number not only by a maximum tolerable number, given the number of service providers that are accommodated, but to scale the number in accordance with a tariff. Thus, service providers that anticipate making high volume use of voice announcing equipment will need to pay a higher tariff to the local exchange carrier for its provision of access to these resources so that the service provider can occupy a relatively large number of these resources simultaneously.

There is an alternate way of defining the resource occupancy number that may be used in lieu of or in addition to a total number of limited resources or a class of resources.

In particular, it is important to limit not only the total number of limited resources occupied by a service but the total number of limited resources at a given resource owner, i.e., at a given switch or a given service node. For example, if there are five voice announcement circuits on a particular service node that may be accessed by a service provider SCP, it is important to make sure that a single service provider SCP cannot occupy all five circuits at one time to the .preclusion of providing voice circuits to other applications running on the network. This can be the specific definition of a resource occupancy number in embodiments of the present invention. Additionally, it may be specified as an additional limitation even if the service application is allowed to occupy more than that number of limited resources among various resource owners in the network.

The method of the present invention preferably defines a resource occupancy number that is a predetermined maximum limit on the number of limited resources that may be simultaneously occupied by a service provider application. The system maintains a limited resource count as an up/down count for each service provider application. If step 196 is reached, the mediated access SCP 26' tests whether the limited resource count for this particular service provider currently exceeds the resource occupancy number. If this test is true, YES branch is taken to rejection of the message in step 187A, provision of default application in step 187B (optional) and to exit the routine in step 187C. It is incumbent upon the service provider to address issues of retry attempts and the like in order to provide the service to its customer that requires the use of the limited resource.

If the limited resource count is still less than the resource occupancy number, NO branch from step 196 is taken to step 198 at which the limited resource count is incremented. After step 198, the process proceeds to exit the routine in step 199.

It should be noted that other routines for handling the termination of conversations, which are not illustrated in the drawing figures, are responsible for decrementing the limited resource count whenever the user of a limited resource as requested by the particular service provider has been completed. Implementation of an up/down counting scheme is simple and well known to those skilled in the art.

In an embodiment, the present invention performs at least another validation or mediation step. In particular, mediated access SCP 26' examines changes that are noted with respect to parameter values in a responsive data packet that correspond to charge numbers and alternate billing numbers. If the parameter value in a responsive data packet corresponding to a charge number or to an alternate billing number is changed from the value in the initial data packet, mediated access SCP 26' compares the changed value (charge number, alternate billing number, or both) to information in database 45 regarding the directory number list of the service provider's customers. If a match is not found between the changed value and the directory number list, mediated access SCP 26' rejects the responsive data packet.

The present invention also provides a method for managing the network through steps performed by the mediated access SCP 26' in monitoring the condition of the service provider SCPs that the mediated access SCP 26' services. One aspect of the management method is that the mediated access SCP 26' keeps track of the time that it takes a service provider SCP to return a responsive message. If the service provider SCP takes longer than a specified minimum amount of time to return a responsive message, the mediated access SCP takes steps to reduce the service provider's load of new messages by discarding some of the messages. If the service provider has specified a default application for discarded messages, the mediated access SCP preferably provides such default application to each discarded message. If the mediated access SCP does not provide a default application, the switch provides the message with standard default treatment such as plain old telephone service (POTS), for example.

Figure 7A:
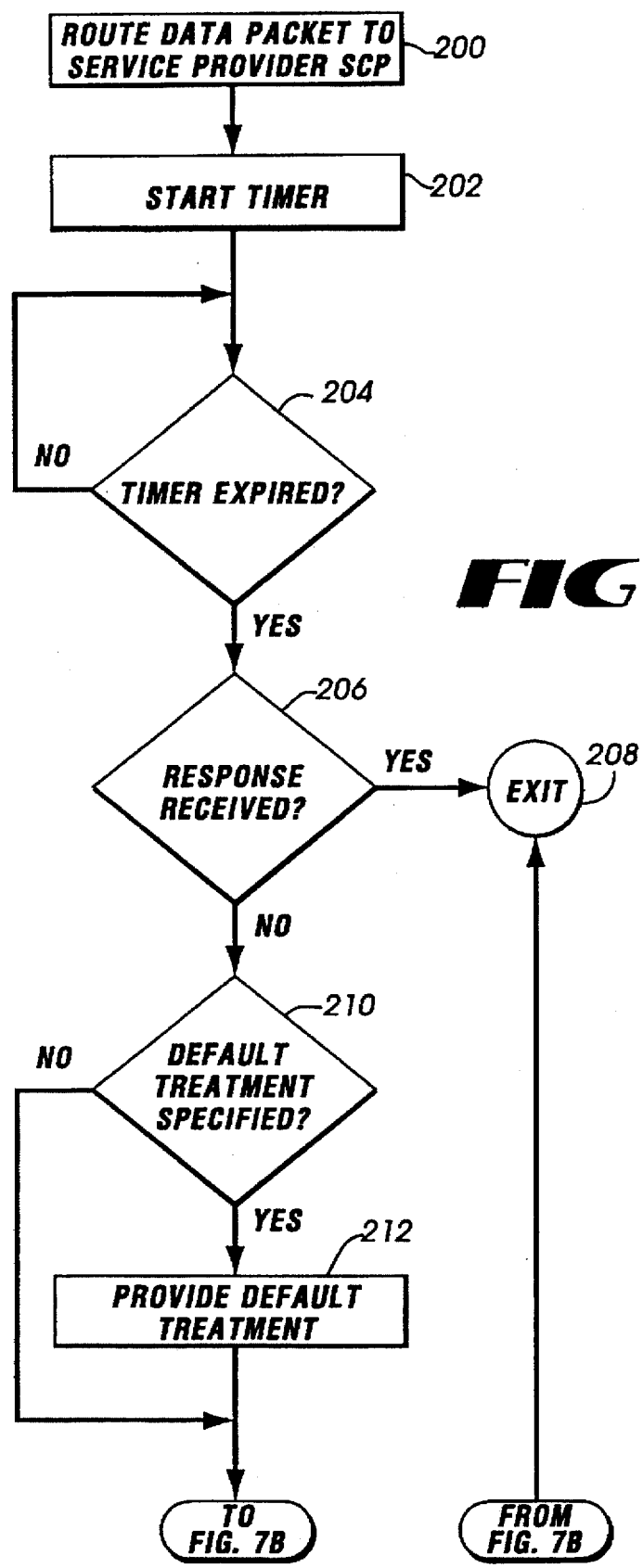
FIG. 7 is a flow chart that illustrates the management method of monitoring the condition of a service provider service control point that is serviced by a mediated access service control point in accordance with the preferred embodiment.
Figure 7B:
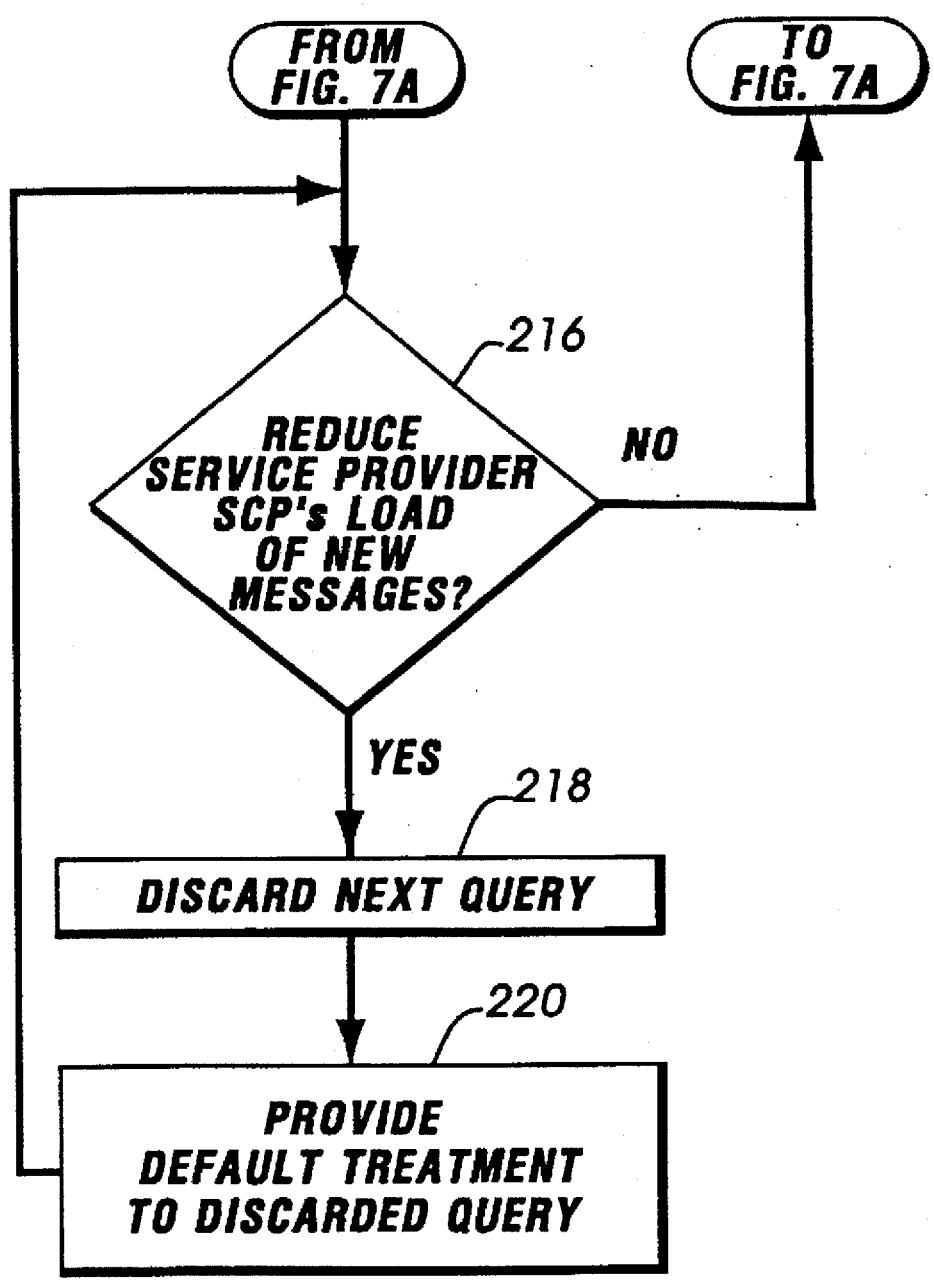

FIG. 7 is a flow chart that illustrates the management method of monitoring the condition of service provider SCP 47 that is serviced by mediated access SCP 26'. In step 200, mediated access SCP 26' routes a data packet to service provider SCP 47, and in step 202 mediated access SCP 26' starts a timer with respect to the amount of time that it takes service provider SCP 47 to return a responsive message. Preferably, the timer is located at mediated access SCP 26'. In decision step 204, mediated access SCP 26' checks whether the timer has expired. The value of this timer preferably is set to a value about two seconds less than the switch timer. If the timer has not expired, NO branch is followed to repeat the step of checking whether the timer has expired until the timer has expired. Once the timer has expired, in step 206 mediated access SCP 26' checks whether a response has been received. If so, in step 208 the routine is exited. If a response has not been received, in step 210 mediated access SCP 26' checks whether the service provider has specified a default treatment or application to be provided. If so, in step 212 mediated access SCP 26' provides the specified default treatment. If the service provider has not provided default treatment, the NO branch of step 210 is followed to step 216 to loop around the provision of default treatment in step 212. In step 216, mediated access SCP 26' checks whether the service provider SCP's load of messages should be reduced. The determination to reduce the service provider SCP's load of messages may be based on a variety of factors including the failure to return one or more responsive messages within the preselected period of time based on information supplied by the timer functions described above. If the message load is not to be reduced, the routine proceeds to exit in step 208. If the message load is to be reduced, in step 218 mediated access SCP 26' proceeds to reduce the message load by discarding the next new query directed to service provider SCP 47. As before, if the service provider has specified a default treatment, in step 220 mediated access SCP 26' provides the discarded new query with such default treatment. After the provision of specified default treatment, the routine loops back to decision step 216 and checks whether the service provider SCP's load of messages should be reduced. An alternate or additional means to reduce the message load of a service provider SCP is the provision of Automatic Call Gapping (ACG) messages by mediated access SCP 26' to the SSPs such as SSPs 15–15' serving an overloaded service provider's customers. Preferably, the mediated access SCP monitors the message flow rate, and in particular, monitors the message rates for each terminating trigger used by a service provider that the mediated access SCP services. If the mediated SCP detects that a service provider SCP is becoming overloaded, the mediated access SCP sends an Automatic Call Gapping message to the SSPs serving the overloaded service provider's customers. If load reduction does not resolve the timing problem, the mediated access SCP determines the service provider SCP to be out-of-service. Steps 216–220 are repeated until a decision is reached that the service provider's load of messages should not be reduced, and the routine is exited in step 208.

Another aspect of the management method of the present invention is that a mediated access SCP monitors the status of a service provider SCP that has been determined previously to be out-of-service. Preferably, mediated access SCP 26" periodically (such as once a minute) sends a test message to the out-of-service service provider SCP. When a test message or a series of test messages is handled correctly by the service provider SCP, traffic to the service provider SCP is automatically restarted by mediated access SCP 26'.

In addition, the present invention also provides for maintenance of a security audit trail with respect to message failures. All mediation failures and Advanced Intelligent Network message failures (such as protocol errors, reject, return_error, application_error, etc.) are considered auditable events. Auditable events include all records about invalid attempts to establish transactions, invalid attempts to access data, and all changes to the configuration of the security processes. For each auditable event, the audit trail includes the date, time, a copy of the TCAP message involved (including MTP and SCCP data), the trigger type and triggering destination number, and any error code. In the present invention, the audit trail concept is viewed analogously to the Advanced Intelligent Network Maintenance Parameter concept. In an embodiment, the present invention includes a parameter in a data packet requesting the receiving network element to turn on a security audit for the accompanying data packet. The security parameter serves as a unique identifier so that a network wide view of the actions taken by the audited user could be obtained by linking audit records from different network elements. The security parameter may be turned on when an unusual security event occurs such as a transaction established after repeated access failures, or a transaction established during the night by a user who normally operates only during the day.

Another aspect of the management method of the present invention is that a mediated access SCP monitors and manages the message flow rate both into and out of the service provider SCP that the mediated access SCP serves in accordance with the selected subscription threshold of the service provider SCP and in accordance with network capacity. In particular, service provider SCP 47 is accorded a subscription threshold with respect to message flow rate. The mediated access SCP 26' allows the flow of messages to service provider SCP 47 to reach at least the subscription threshold based on network message traffic. When the flow rate of messages to service provider SCP 47 exceeds the subscription threshold, mediated access SCP 26' evaluates network message traffic in order to determine whether to continue routing of messages to service provider SCP 47. If mediated access SCP 26' has the capacity, in the preferred embodiment mediated access SCP 26' will continue to route messages to service provider SCP 47 even though the subscription threshold of message flow rate is exceeded. If mediated access SCP 26' is overloaded, it will reject queries (as opposed to response messages) for service provider SCP 47. If service provider SCP 47 has selected a default application for rejected messages, mediated access SCP 26' will apply the default application.

An alternate or additional means to reduce the message load on mediated access SCP 26' is the provision of Automatic Call Gapping (ACG) messages by mediated access SCP 26' to the SSPs such as SSPs 15–15'. Preferably, as described below in connection with FIG. 8, mediated access SCP 26' monitors the message flow rate, and in particular, monitors the message flow rate for each terminating trigger used by a service provider that mediated access SCP 26' services. If mediated access SCP 26' detects that it is becoming overloaded, mediated access SCP 26' sends an Automatic Call Gapping (ACG) message to the SSPs serving the customers of the service providers served by mediated access SCP 26'.

Figure 8A:
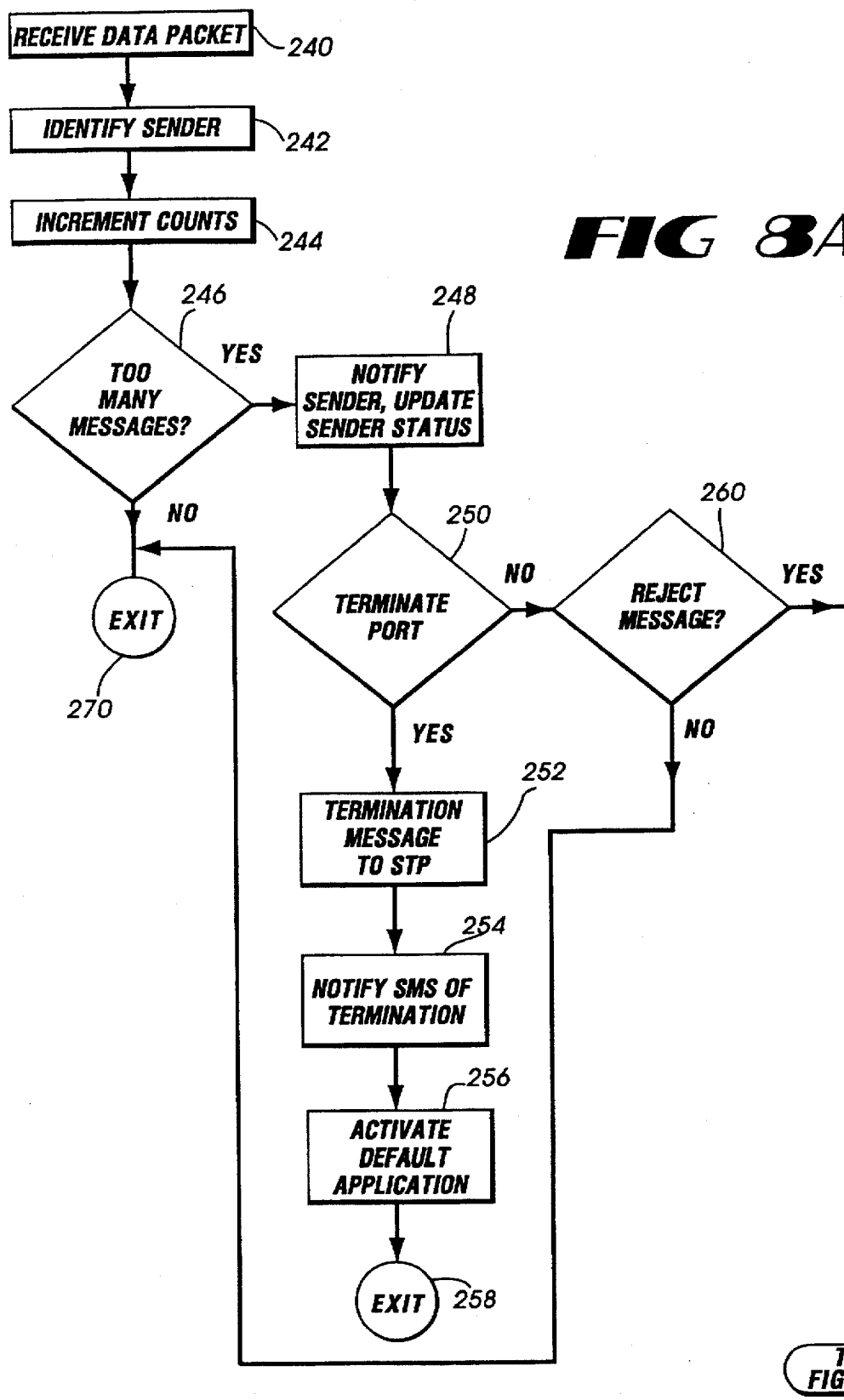
FIG. 8 is a flow chart that illustrates message flow rate monitoring and management in accordance with the preferred embodiment.
Figure 8B:
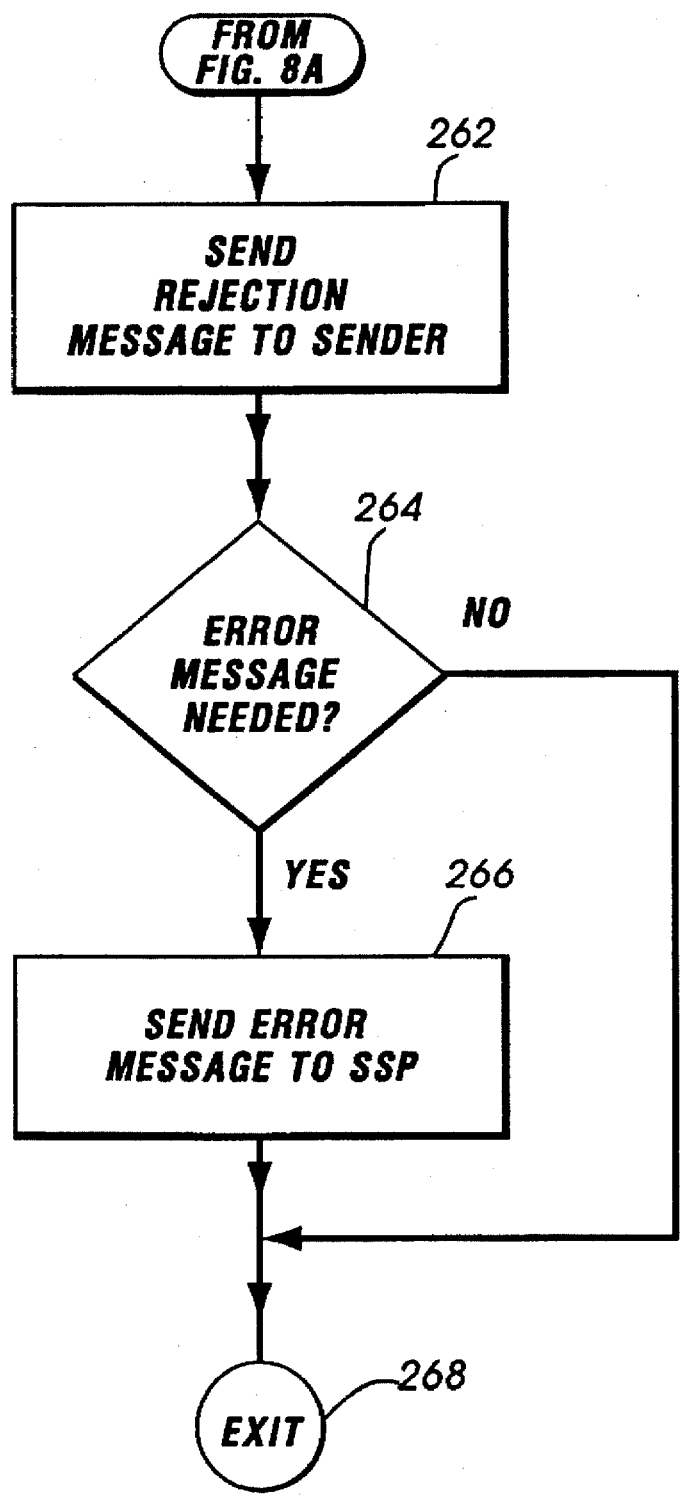

FIG. 8 is a flow chart that illustrates flow rate monitoring and management of the present invention. Upon receipt of a data packet in step 240, in step 242 mediated access SCP 26' checks the appropriate fields of the data packet for a sender identifier. The sender identifier is a code that identifies the entity that created the message. At routine 244, current counts associated with the sender identified in step 242 are incremented and appropriate timer values are stored. These counts are maintained for several purposes. One is to maintain the count of query/response pairs generated by a particular sender in order to effect billing of the third party service providers for the use of the Advanced Intelligent Network. Additionally, an inbound message rate at which packet messages are provided across interface 48 from the service provider operating SCP 47 is calculated. This incoming message rate is an average over a relatively short period of time. Additionally, a longer period average is maintained so that an alarm condition of excess message traffic can be detected. In the preferred embodiment, only the short period inbound message rate exceeding a predetermined value will cause interface 48 to be blocked.

At step 246, the calculated inbound message rate is compared to an authorized message rate number for the particular service provider, which number is stored in a service provider record in database 45 within mediated access SCP 26'. If the inbound message rate is excessive by the criteria established, YES branch is taken to routine 248 at which a message notifying service provider SCP 47 is transmitted back across interface 48 by the mediated access SCP 26'. This allows the service provider SCP to take any appropriate action that it is capable of taking when the rate at which it is transmitting messages across interface 48 is greater than it has indicated will be used.

From here, the routine proceeds to decision step 250 at which the extent to which the inbound message rate exceeds the authorized message rate is checked. If the inbound message rate exceeds the authorized message rate number by at least a predetermined amount, such that the ability of the network to provide adequate and timely service to other service providers will be impaired, the mediation process will terminate message travel across the physical port and block interface 48. If this option is required, YES branch is taken from step 250. If, on the other hand, the inbound message rate is too high, but not so excessive as to seriously deteriorate network performance, NO branch is taken from step 250.

Consider first the circumstances in which the inbound message rate exceeds the authorized message rate number by at least the above referenced predetermined amount. The logic advances to step 252 at which a termination message is sent to STP 20'. This instructs the STP to terminate inbound traffic across interface 48, and thus, block the physical port represented thereby. Next, step 254 is reached at which the SCP notifies the service management system (FIG. 1) of the termination of access at the port 48 of SS7 data link 46. This gives personnel at the service management system an opportunity to contact the service provider whose access is being cut off to see if corrective action can be taken. Additionally, it will notify the service management system of the termination in anticipation of possible complaints from customers of this particular service provider.

The routine represented by step 256 is activation of a default application that has been described above. From the previous description of the pattern of passing packet messages back and forth in the embodiment of FIG. 2, it will be appreciated that part of the default application is to terminate the process of sending packets from SCP 26' to SS7 data link 46 in response to packets originated within one of the central offices (SSPs) 15–15'. Therefore, rather than performing the normal mediation functions and then passing the packet on to service provider SCP 47, the mediated access SCP 26' must make a decision as to what response the default application will give to the received packet that would normally be sent to service provider SCP 47. It should thus be understood that once this state is entered, the particular packets transmitted outbound by mediated access SCP 26' in response to packets ultimately intended for service provider SCP 47 will be modified in accordance with the default application running on SCP 26', and that this condition will prevail until the blocking of the interface 48 is cleared. Therefore, it should be understood that part of the test employed at step 246 is to determine whether interface 48 has already been blocked. If that is the case, it would be wasteful to continue to issue termination instructions.

Once the default application has been activated, the routine is exited at step 258 until the next packet is received.

Next, the situation in which the NO branch is taken from step 250 is considered. First, decision step 260 is executed at which criteria for rejecting the message are examined. The criteria include the extent to which the inbound message rate exceeds the authorized message rate number, and the nature of the message itself. With respect to the latter consideration, the message may be one that, if simply rejected and not sent to its addressed destination, could leave a customer's phone locked in a state in which it cannot provide service. There are other criteria upon which the decision at step 260 can be based. On the assumption that the message is not rejected, NO branch is taken that leads to exit of the routine in step 248.

If the message is to be rejected, YES branch is taken from step 260 that leads to step 262. At this step, a rejection message is transmitted to the sender, in the example under consideration, service provider SCP 47. Since the rejection of the message may have an adverse impact on operation of another network element, particularly an SSP at a central office switch, a determination is made at step 264 as to whether an error message should be generated as a result of having rejected the message from the service provider. If this is deemed appropriate, YES branch is taken to step 266 at which an error message is sent to the SSP that sent an original message to which SCP 47 was attempting to respond. From here, the routine is exited in step 268. Naturally, if no error message is required, NO branch is taken from step 264 that leads directly to exit of the routine in step 268.

The discussion of the steps between step 248 and 268 has been based on the assumption that the logic of this method detected an excessive inbound message rate at step 246. If the inbound message rate is not excessive, then the NO branch is taken from step 246 directly to exit the routine in step 270.

From the foregoing, it will be appreciated that the methods described herein provide effective mediation across the mediated interface between a service provider SCP and a mediated access SCP. The use of the first and second transaction numbers effectively isolates a service provider from access to sensitive information concerning the local exchange carrier's operation of the network as well as potential access to information about the service provider's competitors. The illustrated mediation steps assure the integrity of messages generated by service providers. Furthermore, the illustrated mediation steps enforce local exchange carrier tariffing of certain privileges within the Advanced Intelligent Network that are granted to service providers and that cause local exchange carriers to expend money to support such privileges. This enforcement prevents any particular service provider from tying up an inordinate percentage of certain types of resources in the network to the detriment of customers of other service providers as well as to the detriment of the local exchange carrier.

From the foregoing description of the preferred embodiment, other embodiments of the present invention will suggest themselves to those skilled in the art and therefore the scope of the present invention is to be limited only by the claims below and equivalents thereof.

What is claimed is:

1. A method for preventing unauthorized transmission of data packet messages between a service provider service control point (SP-SCP) and an intelligent switched telephone network, said network including a plurality of digital data communications channels among a plurality of intelligent switched network elements including at least one signal transfer point (STP) and at least one mediated access service control point (MA-SCP), said MA-SCP being connected to said STP, comprising the steps of:

receiving a message in said STP;

transmitting said message from said STP to said MA-SCP; and mediating said message in said MA-SCP, wherein said MA-SCP includes at least one database containing customer records, wherein said message comprises a first transaction number, and wherein said step of mediating said message in said MA-SCP comprises:

storing a transaction identifier for said message in said database;

generating a second transaction number for said message;

associating said second transaction number with said first transaction identifier in said database;

removing said first transaction number from said message; and adding said second transaction number to said message.

2. The method of claim 1, further comprising the step of:

prior to storing said transaction identifier, reading said message for message information;

comparing said message information for correspondence with at least one customer record in said database; and rejecting said message if said message information fails to correspond to said customer record.

3. The method of claim 1, wherein said transaction identifier includes said first transaction number, an originating point code of said message, and a subsystem number of said message, and wherein said step of storing said transaction identifier comprises storing said first transaction number, said originating point code and said subsystem number.

4. The method of claim 3, wherein said message comprises said first transaction number, said originating point code and said subsystem number, and wherein said step of removing said first transaction number comprises removing said first transaction number, said originating point code and said subsystem number from said message.

5. The method of claim 2, further comprising the step of storing said second transaction number in a list of active second transaction numbers in said database.

6. The method of claim 1, wherein said second transaction number is an unassigned random number, and wherein said step of generating said second transaction number comprises generating said unassigned random number as said second transaction number.

7. A method for preventing unauthorized transmission of data packet messages between a service provider service control point (SP-SCP) and an intelligent switched telephone network, said network including a plurality of elements including at least one signal transfer point (STP) and at least one mediated access service control point (MA-SCP), said MA-SCP being connected to said STP, comprising the steps of:

receiving a message in said STP;

transmitting said message from said STP to said MA-SCP; and mediating said message in said MA-SCP, wherein said MA-SCP includes at least one database containing customer records, and wherein said step of mediating said message in said MA-SCP comprises:

determining whether said message includes a transaction number;

if said message includes said transaction number, comparing said transaction number for correspondence to a list of active transaction numbers stored in said database; and rejecting said message if said transaction number fails to correspond to an entry in said list of active transaction numbers.

8. The method of claim 7, further comprising the steps of:

if said transaction number corresponds to an entry in said list of active transaction numbers, obtaining destination information from said entry; and routing said message on the basis of said destination information.

9. A method for preventing unauthorized transmission of data packet messages between a service provider service control point (SP-SCP) and an intelligent switched telephone network, said network including a plurality of digital data communications channels among a plurality of intelligent switched network elements including at least one signal transfer point (STP) and at least one mediated access service control point (MA-SCP), said MA-SCP being connected to said STP, comprising the steps of:

receiving a message in said STP;

transmitting said message from said STP to said MA-SCP; and mediating said message in said MA-SCP, wherein said message is a response message received from said SP-SCP in response to a query message, and wherein said step of mediating said message in said MA-SCP comprises:

determining whether said response message includes an originating point code;

if said response message includes said originating point code, tempting said originating point code for correspondence to a destination point code associated with said query message; and rejecting said message if said originating point code fails to correspond to said destination point code.

10. A method for preventing unauthorized transmission of data packet messages between a service provider service control point (SP-SCP) and an intelligent switched telephone network, said network including a plurality of elements including at least one mediated access service control point (MA-SCP), comprising the steps of:

receiving a message in said MA-SCP; and mediating said message in said MA-SCP; by:

reading said message for message information from the Advanced Intelligent Network (AIN) potion of said message, comparing said message information from said AIN portion of said message for correspondence to at least one record in a database, and rejecting said message if said message information fails to correspond to said at least one record in said database.

11. A method for preventing unauthorized transmission of data packet messages between a service provider service control point (SP-SCP) and an intelligent switched telephone network, said network including a plurality of elements including at least one signal transfer point (STP) and at least one mediated access service control point (MA-SCP), said MA-SCP being connected to said STP, comprising the steps of:

receiving a message in said STP;

transmitting said message from said STP to said MA-SCP;

mediating said message in said MA-SCP;

determining whether said message has passed mediation in said MA-SCP;

if said message has passed mediation in said MA-SCP, determining whether said SP-SCP is out-of-service; and if said SP-SCP is out-of-service, then rejecting said message and providing said message with a default response.

12. The method of claim 11, wherein said message comprises a request for a particular service provider service, and wherein said step of determining whether said SP-SCP is out-of-service comprises determining whether said particular service provider service is out-of-service; and if said particular service provider service is out-of-service, then rejecting said message and providing said message with said default response.

13. The method of claim 11, further comprising the steps of:

testing said out-of-service SP-SCP; and if said out-of-service SP-SCP properly responds to said testing, reclassifying said out-of-service SP-SCP as an in-service SP-SCP.

14. A method for preventing unauthorized transmission of data packet messages between a service provider service control point (SP-SCP) and an intelligent switched telephone network, said network including a plurality of digital data communications channels among a plurality of intelligent switched network elements including at least one signal transfer point (STP) and at least one mediated access service control point (MA-SCP), said MA-SCP being connected to said STP, comprising the steps of:

receiving a message in said STP, wherein said message comprises an originating point code and wherein said STP has a port identifier for each authorized provider of messages to said STP;

determining whether said message originates with said SP-SCP;

if said message originates with said SP-SCP, then initially mediating said message in said STP by comparing said originating point code for correspondence with at least one port identifier and rejecting said message if said originating point code fails to correspond to any of said port identifiers;

transmitting said message from said STP to said MA-SCP; and mediating said message in said MA-SCP.

15. A method for preventing unauthorized transmission of data packet messages between a service provider service control point (SP-SCP) and an intelligent switched telephone network, said network including a plurality of digital data communications channels among a plurality of intelligent switched network elements including at least one signal transfer point (STP) and at least one mediated access service control point (MA-SCP), said MA-SCP being connected to said STP, comprising the steps of:

receiving a message in said STP, wherein said message comprises a destination code and wherein said STP has at least one authorized address designating an authorized destination for messages for each authorized provider of messages to said STP;

determining whether said message originates with said SP-SCP;

if said message originates with said SP-SCP, then initially mediating said message in said STP by comparing said destination code for correspondence with at least one authorized address and rejecting said message if said destination code fails to correspond to any of said authorized addresses;

transmitting said message from said STP to said MA-SCP; and mediating said message in said MA-SCP.

16. The method of claim 15, wherein one of said authorized addresses comprises the address of said MA-SCP, wherein said step of comparing comprises comparing said destination code for correspondence with said address of said MA-SCP, and wherein said step of rejecting comprises rejecting said message if said destination code fails to correspond to said address of said MA-SCP.

17. A method for preventing unauthorized transmission of data packet messages between a service provider service control point (SP-SCP) and an intelligent switched telephone network, said network including a plurality of digital data communications channels among a plurality of intelligent switched network elements including at least one signal transfer point (STP) and at least one mediated access service control point (MA-SCP), said MA-SCP being connected to said STP, comprising the steps of:

receiving a message in said STP, wherein said message comprises a service indicator, and wherein said STP has at least one service indicator designating an authorized service for each authorized provider of messages to said STP;

determining whether said message originates with said SP-SCP;

if said message originates with said SP-SCP, then initially mediating said message in said STP by comparing said service indicator for correspondence with at least one authorized service indicator and rejecting said message if said service indicator fails to correspond to any of said authorized service indicators;

transmitting said message from said STP to said MA-SCP; and mediating said message in said MA-SCP.

18. A method of mediating traffic in packet messages in an intelligent switched telephone network that includes a plurality of digital data communications channels among a plurality of network elements, comprising the steps of:

causing a first one of said plurality of network elements that originates a new transaction capabilities application part (TCAP) message to generate a first transaction number for each said new TCAP message;

causing said first network element to include said first transaction number said TCAP message prior to said first network element transmitting said TCAP message to a second one of said plurality of network elements;

causing said second network element to create a unique transaction identifier for association with said TCAP message;

causing said second network element to generate a second transaction number for said TCAP message;

causing said second network element to delete said first transaction number from said TCAP message;

causing said second network element prior to said network element transmitting said TCAP message to another destination to include said second transaction number said TCAP message; and causing said network elements to thereafter reject other TCAP messages that effect the particular transaction associated with said TCAP message but that do not contain said second transaction number in said other TCAP messages.

19. The method of claim 18, further comprising the step of:

causing said first network element to store said first transaction number in a transaction identifier table.

20. The method of claim 18, further comprising the steps of:

causing said second network element to store said unique transaction identifier in a transaction identifier table; and causing said second network element to store said second transaction number in said transaction identifier table in association with said unique transaction identifier.

21. The method of claim 18, wherein said step of causing said first network element to include said first transaction number comprises causing said first network element to include said first transaction number and a first message identifier in said TCAP message.

22. The method of claim 18, wherein said TCAP message comprises an originating point code and a subsystem number, and wherein said step of causing said second network element to create said unique transaction identifier comprises causing said second network element to create said unique transaction identifier by concaterating said first transaction number with said originating point code and said subsystem number.

23. The method of claim 22, wherein said step of causing said second network element to delete said first transaction number comprises causing said second network element to delete said first transaction number, said originating point code and said subsystem number from said TCAP message.

24. A method of mediating traffic in packet messages between a service provider service control point (SP-SCP) and an intelligent switched telephone network that includes a plurality of digital data communications channels among a plurality of network elements including a plurality of service switching points, at least one mediated access service control point (MA-SCP) and at least one signal transfer point (STP), comprising the steps of:

causing said SP-SCP to generate a first transaction number for each new message that said SP-SCP originates;

causing said SP-SCP to include said first transaction number in said message prior to said SP-SCP transmitting said message to one of said plurality of network elements;

after said network element receives said message, causing said network element to create a unique transaction identifier for association with said message;

causing said network element to generate a second transaction number for said message;

causing said network element to store said second transaction number in association with said unique transaction identifier;

causing said network element to delete said first transaction number from of said message;

causing said network element to add said second transaction number to said message; and causing said SP-SCP and said network elements thereafter to include said second transaction number in other messages affecting the particular transaction associated with said message and to reject said other messages that do not include said second transaction number.

25. The method of claim 24, wherein said message comprises an originating point code, wherein said network element has a port identifier for each authorized provider of messages to said network element, and further comprising the steps of:

causing said network element to compare said originating point code for correspondence with a port identifier;

causing said network element to reject said message if said originating point code fails to correspond to any of said port identifiers.

26. The method of claim 24, wherein said message comprises a destination code, wherein said network element has at least one authorized address designating an authorized destination for messages for each authorized provider of messages to said network element, and further comprising the steps of:

causing said network element to compare said destination code for correspondence with at least one authorized address;

causing said network element to reject said message if said destination code fails to correspond to any of said authorized addresses.

27. The method of claim 24, wherein said message comprises a service indicator, wherein said network element has at least one service indicator designating an authorized service for each authorized provider of messages to said network elements, and further comprising the steps of:

causing said network element to compare said service indicator for correspondence with at least one authorized service indicator;

causing said network element to reject said message if said service indicator fails to correspond to said authorized service indicator.

28. A method of mediating traffic in data packet messages between a service provider service control point (SP-SCP) and an intelligent switched telephone network including a signal transfer point (STP) and a mediated access service control point (MA-SCP), comprising the steps of:

providing that said SP-SCP be allowed to use only particular trunk group routings of said network with respect to use of said network by said SP-SCP;

causing said MA-SCP to maintain a table of legal trunk group indices for said SP-SCP, said legal trunk group indices representing said particular trunk group routings which may be used by said SP-SCP;

receiving a message associated with said SP-SCP in said STP;

transmitting said message from said STP to said MA-SCP;

in response to said MA-SCP receiving said message associated with said SP-SCP wherein said message includes a request for a trunk group routing, causing said MA-SCP to check said table for an entry corresponding to said trunk group routing; and causing said MA-SCP to reject said message if said trunk group routing fails to correspond to any entry in said table.

29. A method of mediating traffic in data packet messages between a service provider service control point (SP-SCP) and an intelligent switched telephone network including a mediated access service control point (MA-SCP), comprising the steps of:

providing that said SP-SCP has authorized access to a plurality of network elements of said network;

causing said MA-SCP to maintain a table of authorized directory numbers of network elements for said SP-SCP, each of said authorized directory numbers representing a network element of said plurality of network elements to which said SP-SCP has said authorized access;

receiving a message associated with said SP-SCP in said STP;

transmitting said message from said STP to said MA-SCP;

in response to said MA-SCP receiving said message associated with said SP-SCP wherein said message includes a request for access to a particular network element and includes a directory number for said particular network element, causing said MA-SCP to check said table for said directory number of said particular network element; and causing said MA-SCP to reject said message if said directory number of said particular network element fails to correspond to an entry in said table.

30. A method of mediating traffic in data packet messages between a service provider service control point (SP-SCP) and an intelligent switched telephone network including a mediated access service control point (MA-SCP), comprising the steps of:

causing said MA-SCP to maintain a permitted limited network resource occupancy number for said SP-SCP with respect to the use of limited network resources of said network, said limited network resources comprising audio connection devices;

causing said MA-SCP to maintain a current count of each limited network resource occupied by said SP-SCP within a preselected period;

receiving a message associated with said SP-SCP in said STP;

transmitting said message from said STP to said MA-SCP;

in response to said MA-SCP receiving said message associated with said SP-SCP wherein said message includes a request for use of a limited network resource, causing said MA-SCP to check said current count; and causing said MA-SCP to reject said message if said current count is equal to or greater than said permitted resource occupancy number.

31. A method of mediating traffic in data packet message between a service provider service control point (SP-SCP) and an intelligent switched telephone network including a mediated access service control point (MA-SCP), comprising the steps of:

causing said MA-SCP to maintain a current count of each default treatment provided within a preselected period by said MA-SCP with respect to messages directed to said SP-SCP; and if said current count is equal to or exceeds a preselected count of default treatment to be provided to messages directed to said SP-SCP, causing said MA-SCP to reduce the number of messages provided to said SP-SCP.

32. The method of claim 31, wherein said step of causing said MA-SCP to reduce the number of messages comprises causing said MA-SCP to reject the next message directed to said SP-SCP.

33. The method of claim 31, wherein said network includes at least one service switching point (SSP) servicing said SP-SCP, and wherein said step of causing said MA-SCP to reduce the number of messages comprises causing said MA-SCP to send an automatic cell gapping message to said SSP.

34. The method of claim 13, wherein said step of testing said out-of-service service control point comprises sending said out-of-service SP-SCP a test message.

35. The method of claim 34, wherein said step of testing said out-of-service service control point comprises sending said out-of-service SP-SCP a test message on a periodic basis.

36. A method of managing mediated traffic in data packet messages between an out-of-service service provider service control point (SP-SCP) and an intelligent switched telephone network including a mediated access service control point (MA-SCP), comprising the steps of:

classifying a SP-SCP as said out-of-service SP-SCP;

causing said MA-SCP to send said out-of-service SP-SCP an Advanced Intelligent Network (AIN) test message; and if said out-of-service SP-SCP correctly responds to said AIN test message, causing said MA-SCP to classify said out-of-service SP-SCP as an in-service SP-SCP.

37. The method of claim 36, wherein said step of sending said out-of-service service control point an AIN test message comprises sending said out-of-service SP-SCP an AIN test message on a periodic basis.

38. A method of managing mediated traffic in data packet messages between a service provider service control point (SP-SCP) and an intelligent switched telephone network including a mediated access service control point (MA-SCP), comprising the steps of:

causing said MA-SCP to recognize an auditable event with respect said mediated traffic in data packet messages between said SP-SCP and said MA-SCP wherein said auditable event comprises an invalid attempt to establish a transaction, an invalid attempt to access data or a change to a security process configuration; and causing said MA-SCP to create an audit trail for said auditable event.

39. A method of managing mediated traffic in data packet messages between a service provider service control point (SP-SCP) and an intelligent switched telephone network including a mediated access service control point (MA-SCP), comprising the steps of:

causing said MA-SCP to recognize an auditable event with respect to said mediated traffic in data packet messages between said SP-SCP and said MA-SCP, wherein said auditable event involves a message, and causing said MA-SCP to create an audit trail for said auditable event, wherein said audit trail comprises the date, the time, the trigger type and the triggering destination number of said message and a copy of said message, and wherein said step of causing said MA-SCP to create an audit trail for said auditable event comprises causing said MA-SCP to create said audit trail including said data, said time, said trigger type and said triggering destination of said message and said copy of said message.

40. A method of managing mediated traffic in data packet messages between a service provider service control point (SP-SCP) and a plurality of network elements in an intelligent switched telephone network, comprising the steps of:

causing a mediated access service control point (MA-SCP) to attach a security audit request parameter to a message received from the SP-SCP; and in response to receipt of said message including said security audit request parameter at one of said plurality of network elements, causing said one of said plurality of said network elements to turn on a security parameter for said message.

41. The method of claim 40, further comprising the step of:

in response to receipt of said message including said security audit request parameter at any other one of said plurality of network elements causing said any other network element to include said security parameter with other messages that affect the particular transaction associated with said message.

42. A method for preventing unauthorized access of data packet messages from a service provider service control point (SP-SCP) to an intelligent switched telephone network, said network including a plurality of digital data communications channels among a plurality of intelligent switched network elements including at least one signal transfer point (STP) and at least one mediated access service control point MA-SCP), said MA-SCP being connected to said STP, comprising the steps of:

receiving a message in said STP from said SP-SCP;

transmitting said message from said STP to said MA-SCP; and mediating said message in said MA-SCP by examination by said MA-SCP of the Advanced Intelligent Network (AIN) portion of said message, removing information from said AIN portion of said message, and adding substitute information to said AIN portion of said message.

43. In an intelligent switch telephone network, an apparatus for preventing unauthorized access of data packet messages from a service provider service control point (SP-SCP) in said network, said network including a plurality of digital data communication channels among a plurality of intelligent switched network elements including at least one signal transfer point (STP) and at least one mediated access service control point (MA-SCP), said MA-SCP being connected to said STP comprising:

a MA-SCP, said MA-SCP being operative to receive a message from said SP-SCP, said message including an Advanced Intelligent Network (AIN) portion, and prior to further routing of said message in said network, said MA-SCP being further operative to mediate said message by examination of said AIN portion, by removing information from said AIN portion and by adding substitute information to said AIN portion.

44. The apparatus of claim 43, wherein said MA-SCP is further operative upon receipt of said message from said SP-SCP to read said message for message information, to compare said message information for correspondence with at least one record in a database, and to reject said message if said message information fails to correspond to said record in said database.

45. A method of managing mediated traffic in data packet messages between a service provider service control point (SP-SCP) and an intelligent switched telephone network including a mediated access service control point (MA-SCP), comprising the steps of:

causing said MA-SCP to recognize an auditable event with respect to said mediated traffic in data packet messages between said SP-SCP and said MA-SCP, wherein said auditable event involves a message, and causing said MA-SCP to create an audit trail for said auditable event, wherein said audit trail comprises the date, the time, and a copy of said message, and wherein said step of causing said MA-SCP to create an audit trail for said auditable event comprises causing said MA-SCP to create said audit trail including said date, said time, and said copy of said message.

46. A method for preventing unauthorized access of data packet messages from a service provider service control point (SP-SCP) to an intelligent switched telephone network, said network including a plurality of digital data communications channels among a plurality of intelligent switched network elements at least one signal transfer point (STP) and at least one mediated access service control point (MA-SCP), said MA-SCP being connected to said STP, comprising the steps of:

receiving a message in said STP from said SP-SCP;

transmitting said message from said STP to said MA-SCP; and mediating said message in said MA-SCP by examination by said MA-SCP of the Advanced Intelligent Network (AIN) portion of said message, wherein said examination includes a determination as to whether said AIN portion of said message includes valid or invalid parameters with respect to access to said network by said SP-SCP, and by rejection by said MA-SCP of said message if said MA-SCP determines that said AIN portion of said message includes said invalid AIN parameters.

\* \* \* \* \*